US012588060B2

(12) United States Patent (10) Patent No.: US 12,588,060 B2
Elazzouni et al. (45) Date of Patent: Mar. 24, 2026

(54) CHANNEL OCCUPANCY TIME SHARING FOR SIDELINK COMMUNICATIONS

(71) Applicant: QUALCOMM Incorporated, San Diego, CA (US)

(72) Inventors: Sherif Elazzouni, San Diego, CA (US); Giovanni Chisci, San Diego, CA (US); Qing Li, Princeton Junction, NJ (US); Ozcan Ozturk, San Diego, CA (US); Xiaoxia Zhang, San Diego, CA (US); Junyi Li, Fairless Hills, PA (US); Jing Sun, San Diego, CA (US); Chih-Hao Liu, San Diego, CA (US); Yisheng Xue, San Diego, CA (US); Aleksandar Damnjanovic, Del Mar, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 798 days.

(21) Appl. No.: 17/818,350

(22) Filed: Aug. 8, 2022

(65) Prior Publication Data

US 2024/0049283 A1 Feb. 8, 2024

(51) Int. Cl.
*H04W 74/0816* (2024.01)
*H04L 27/26* (2006.01)
(Continued)

(52) U.S. Cl.
CPC ..... *H04W 74/0816* (2013.01); *H04L 27/2605* (2013.01); *H04W 72/0446* (2013.01);
(Continued)

(58) Field of Classification Search
CPC ......... H04W 74/0816; H04W 72/0446; H04W 72/20; H04W 74/002; H04W 74/0866;
(Continued)

(56) References Cited

U.S. PATENT DOCUMENTS

2022/0060944 A1 2/2022 Sun et al.
2022/0217771 A1 7/2022 Liu et al.
(Continued)

FOREIGN PATENT DOCUMENTS

CN 114731528 A 7/2022
WO 2022061754 A1 3/2022

OTHER PUBLICATIONS

Moderator(OPPO): "FL Summary #4 for AI 9.4.1.1: SL-U Channel Access Mechanism", 3GPP TSG RAN WG1 #109-e, R1-2205183, 3GPP, Mobile Competence Centre, 650, Route Des Lucioles, F-06921 Sophia-Antipolis Cedex, France, vol. RAN WG1, No. e-Meeting, May 9, 2022-May 20, 2022, May 21, 2022, 122 Pgs, XP052191823, Sec. "4.2 Topic #2: Channel access mechanisms for SL-U", p. 35, Last Para, p. 36, Intel Contribution, 5th Bullet point, p. 42, Third But Last Bullet Point, p. 55, Sec. 4.3, Subsec "Background", p. 117, Subsec, "SL-U UE to UE COT Sharing".
(Continued)

*Primary Examiner* — Sharmin Chowdhury

(74) *Attorney, Agent, or Firm* — Harrity & Harrity LLP

(57) ABSTRACT

Wireless communications systems, apparatuses, and methods are provided. A method of wireless communication performed by a first sidelink user equipment (UE) may include performing a listen-before-talk (LBT) procedure, acquiring, based on the LBT procedure being successful, a channel occupancy time (COT), and transmitting, to a second sidelink UE during the COT, COT sharing information for sharing the COT with the second sidelink UE.

30 Claims, 16 Drawing Sheets

(51) Int. Cl.

| | |
|---|---|
| *H04W 72/0446* | (2023.01) |
| *H04W 72/20* | (2023.01) |
| *H04W 74/00* | (2009.01) |
| *H04W 74/08* | (2024.01) |

(52) U.S. Cl.
CPC ......... *H04W 72/20* (2023.01); *H04W 74/002* (2013.01); *H04W 74/0866* (2013.01)

(58) Field of Classification Search
CPC . H04W 72/02; H04W 72/25; H04W 74/0808; H04W 76/14; H04L 27/2605
See application file for complete search history.

(56) References Cited

U.S. PATENT DOCUMENTS

| | | | | |
|---|---|---|---|---|
| 2022/0248384 | A1 | 8/2022 | Sun et al. | |
| 2023/0106442 | A1* | 4/2023 | Hu ...................... | H04W 74/002 370/329 |
| 2023/0354429 | A1* | 11/2023 | Niu ........................ | H04W 72/40 |
| 2024/0007237 | A1* | 1/2024 | Cheng ................... | H04L 5/0041 |
| 2025/0056573 | A1* | 2/2025 | Zhang ................... | H04W 92/18 |
| 2025/0089094 | A1* | 3/2025 | Freda ................... | H04W 72/25 |
| 2025/0142594 | A1* | 5/2025 | Ganesan ............... | H04W 72/25 |

OTHER PUBLICATIONS

Partial International Search Report—PCT/US2023/028506—ISA/EPO—Oct. 27, 2023.

Qualcomm Incorporated: "Channel Access Mechanism for Sidelink on Unlicensed Spectrum", 3GPP TSG RAN WG1 Meeting #109-e, R1-2205033, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, pp. 1-18, XP052144139, p. 9, Paragraph Before Observation 6 and Paragraph Before Proposal 6, and Proposal 6.

International Search Report and Written Opinion—PCT/US2023/028506—ISA/EPO—Feb. 12, 2024.

\* cited by examiner

800

1100

Perform, by a first sidelink user equipment (UE) a listen-before-talk (LBT) procedure — 1110

Acquire, based on the LBT procedure being successful, a channel occupancy time (COT) — 1120

Transmit, to a second sidelink UE during the COT, COT sharing information for sharing the COT with the second sidelink UE — 1130

Figure 12:
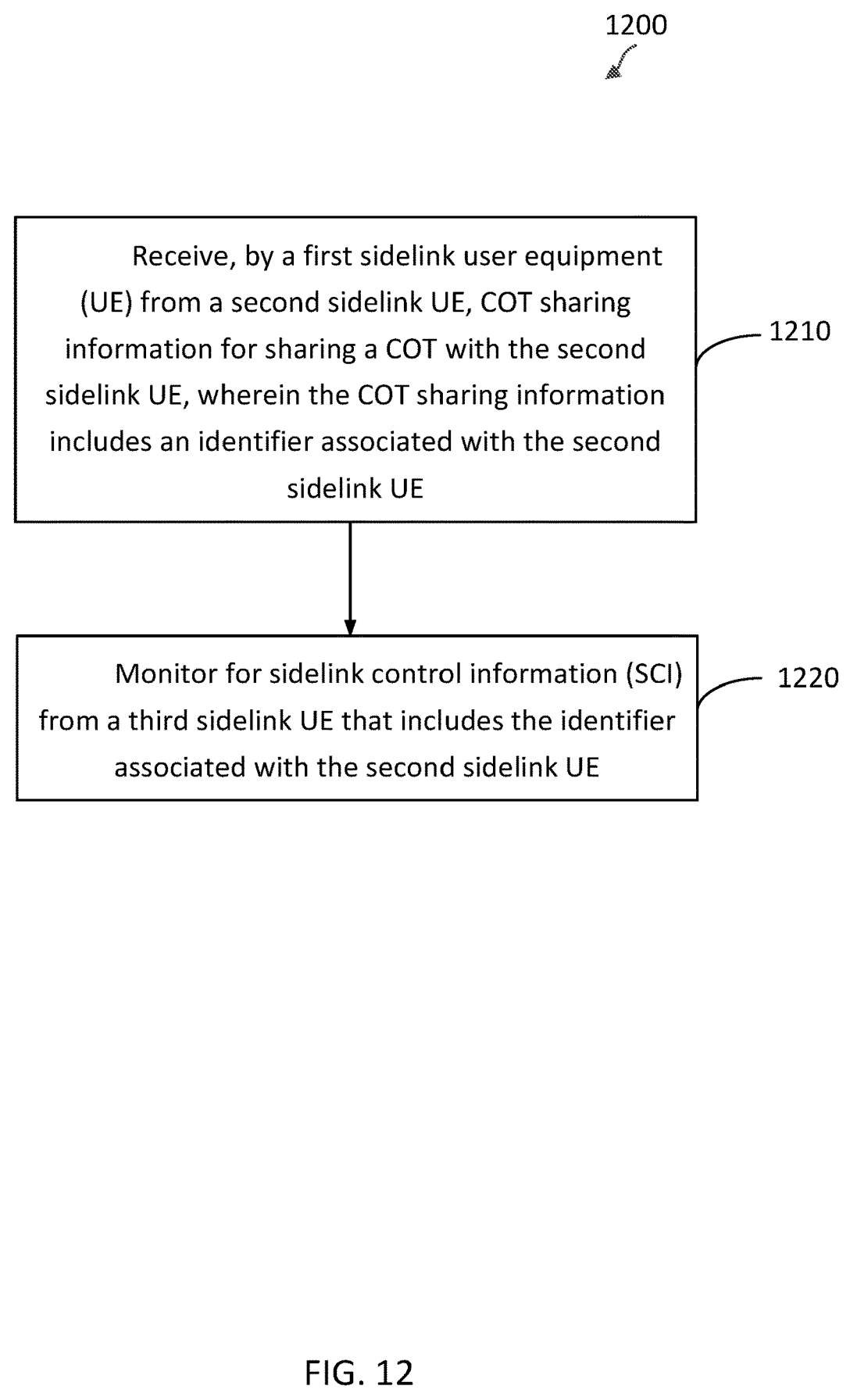

1200

Receive, by a first sidelink user equipment (UE) from a second sidelink UE, COT sharing information for sharing a COT with the second sidelink UE, wherein the COT sharing information includes an identifier associated with the second sidelink UE — 1210

Monitor for sidelink control information (SCI) from a third sidelink UE that includes the identifier associated with the second sidelink UE — 1220

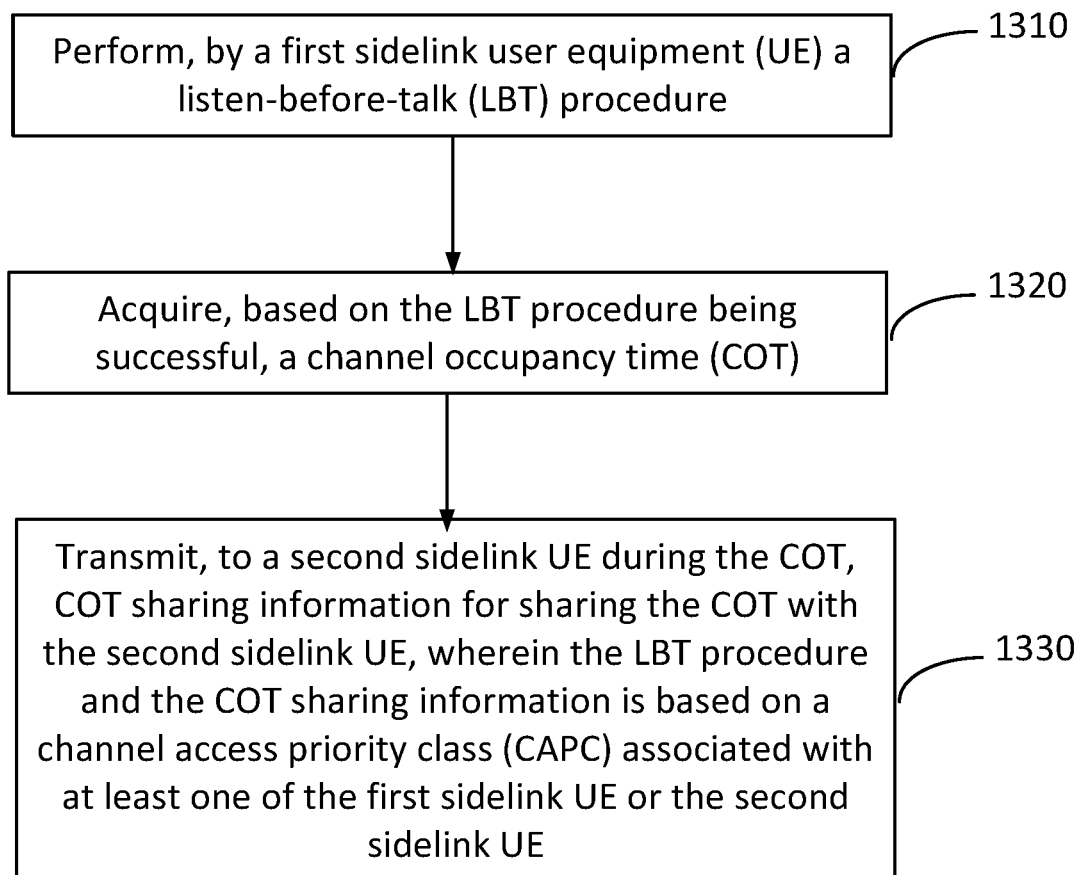

Perform, by a first sidelink user equipment (UE) a listen-before-talk (LBT) procedure — 1310

Acquire, based on the LBT procedure being successful, a channel occupancy time (COT) — 1320

Transmit, to a second sidelink UE during the COT, COT sharing information for sharing the COT with the second sidelink UE, wherein the LBT procedure and the COT sharing information is based on a channel access priority class (CAPC) associated with at least one of the first sidelink UE or the second sidelink UE — 1330

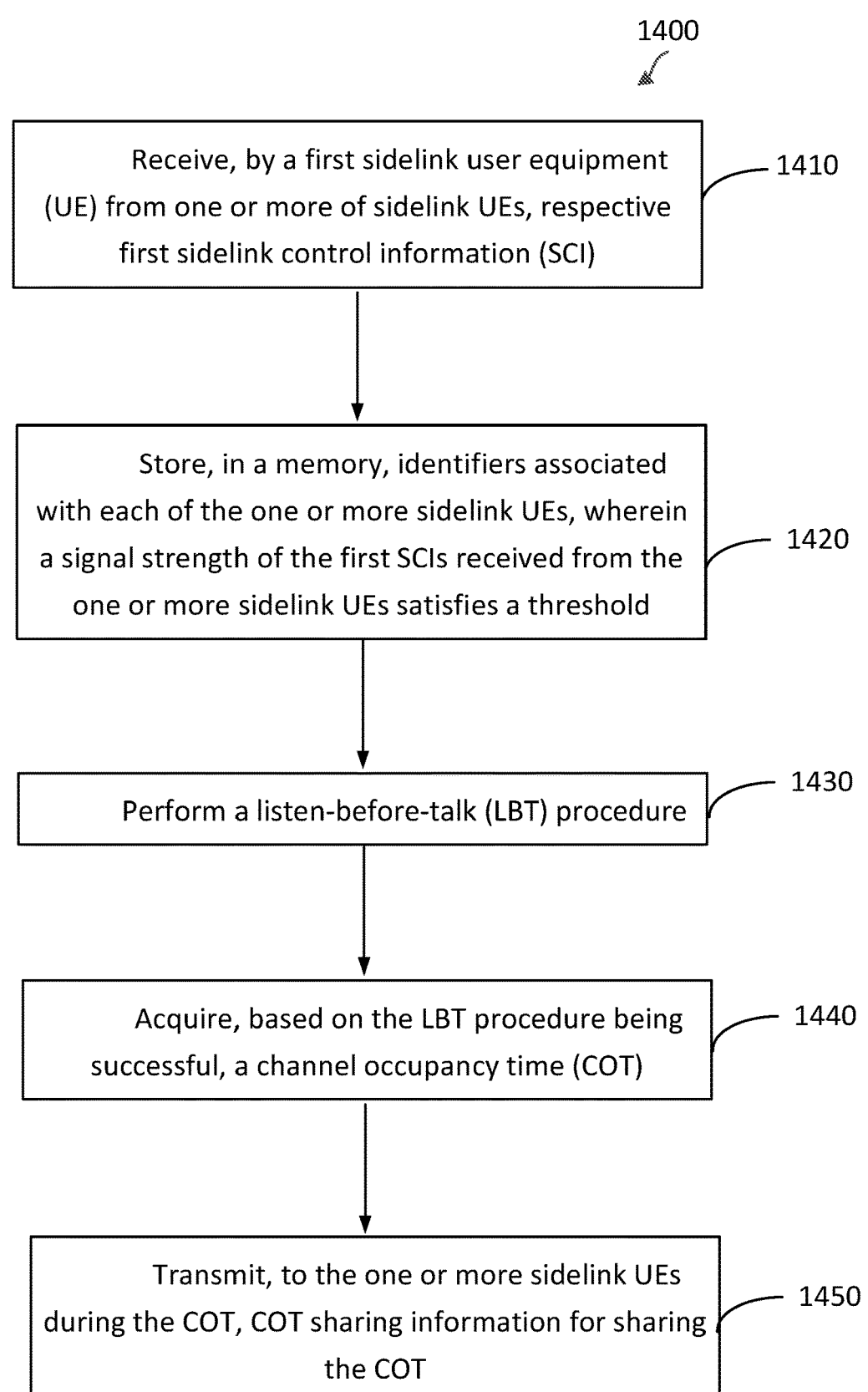

Receive, by a first sidelink user equipment (UE) from one or more of sidelink UEs, respective first sidelink control information (SCI) — 1410

Store, in a memory, identifiers associated with each of the one or more sidelink UEs, wherein a signal strength of the first SCIs received from the one or more sidelink UEs satisfies a threshold — 1420

Perform a listen-before-talk (LBT) procedure — 1430

Acquire, based on the LBT procedure being successful, a channel occupancy time (COT) — 1440

Transmit, to the one or more sidelink UEs during the COT, COT sharing information for sharing the COT — 1450

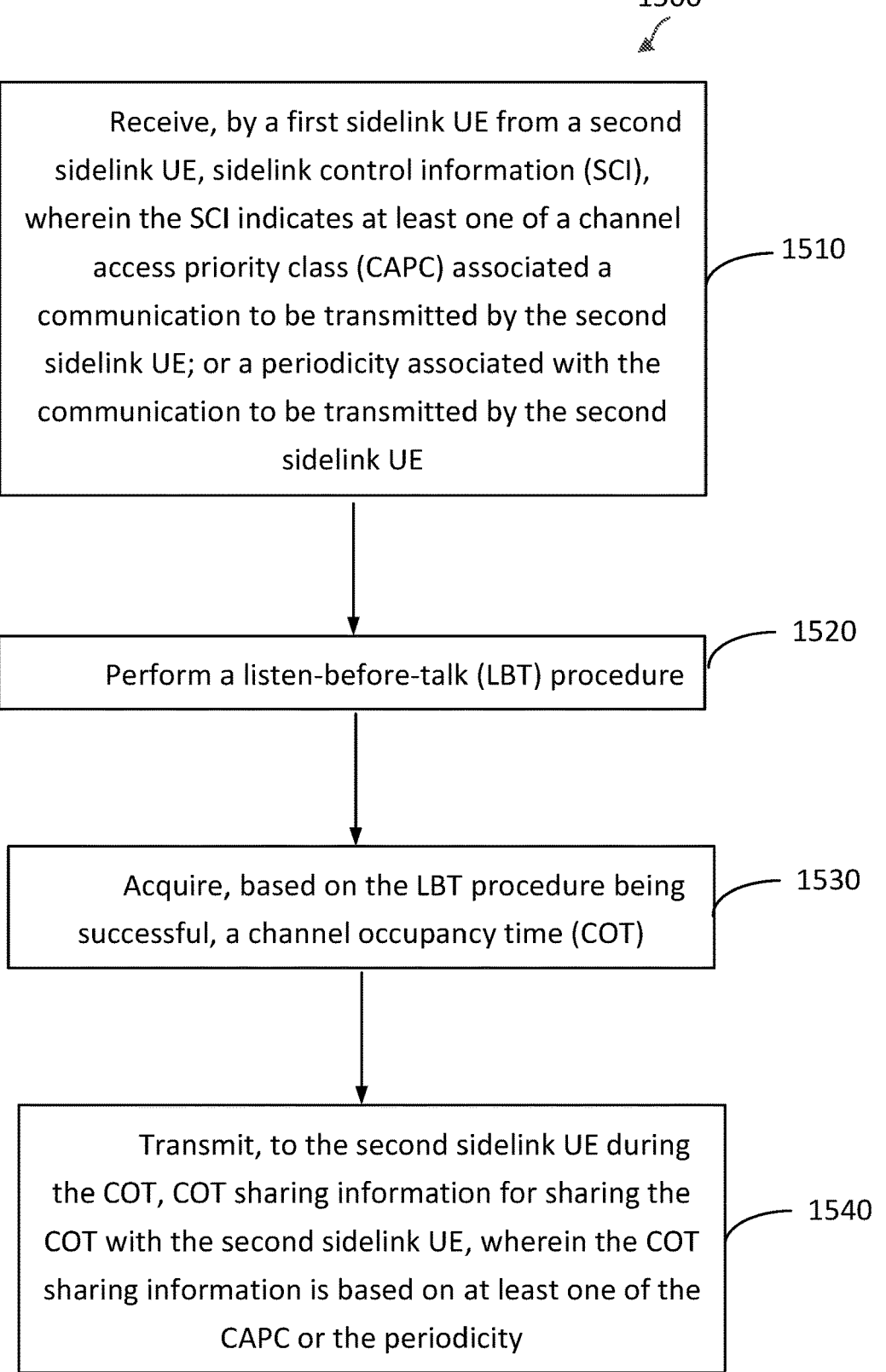

Receive, by a first sidelink UE from a second sidelink UE, sidelink control information (SCI), wherein the SCI indicates at least one of a channel access priority class (CAPC) associated a communication to be transmitted by the second sidelink UE; or a periodicity associated with the communication to be transmitted by the second sidelink UE — 1510

Perform a listen-before-talk (LBT) procedure — 1520

Acquire, based on the LBT procedure being successful, a channel occupancy time (COT) — 1530

Transmit, to the second sidelink UE during the COT, COT sharing information for sharing the COT with the second sidelink UE, wherein the COT sharing information is based on at least one of the CAPC or the periodicity — 1540

| Receive, by a first sidelink user equipment (UE) from a second sidelink UE, a channel occupancy time (COT) access request |
|---|

1610

↓

| Perform a listen-before-talk (LBT) procedure |
|---|

1620

↓

| Acquire, based on the LBT procedure being successful, a channel occupancy time (COT) |
|---|

1630

↓

| Transmit, to the second sidelink UE during the COT, COT sharing information for sharing the COT with the second sidelink UE, wherein the COT sharing information is based on COT access request |
|---|

CHANNEL OCCUPANCY TIME SHARING FOR SIDELINK COMMUNICATIONS

TECHNICAL FIELD

This application relates to wireless communication systems, and more particularly, to channel occupancy time sharing for sidelink communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed frequency bands and/or unlicensed frequency bands (e.g., shared frequency bands).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a first sidelink user equipment (UE) may include performing a listen-before-talk (LBT) procedure; acquiring, based on the LBT procedure being successful, a channel occupancy time (COT); and transmitting, to a second sidelink UE during the COT, COT sharing information for sharing the COT with the second sidelink UE.

In an additional aspect of the disclosure, a method of wireless communication performed by a first sidelink user equipment (UE) may include receiving, from a second sidelink UE, COT sharing information for sharing a COT with the second sidelink UE, wherein the COT sharing information includes an identifier associated with the second sidelink UE; and monitoring for sidelink control information (SCI) from a third sidelink UE that includes the identifier associated with the second sidelink UE.

In an additional aspect of the disclosure, a method of wireless communication performed by a first sidelink user equipment (UE) may include performing a listen-before-talk (LBT) procedure; acquiring, based on the LBT procedure being successful, a channel occupancy time (COT); and transmitting, to a second sidelink UE during the COT, COT sharing information for sharing the COT with the second sidelink UE, wherein the LBT procedure and the COT sharing information is based on a channel access priority class (CAPC) associated with at least one of the first sidelink UE or the second sidelink UE.

In an additional aspect of the disclosure, a method of wireless communication performed by a first sidelink user equipment (UE) may include receiving, from one or more of sidelink UEs, respective first sidelink control information (SCI); storing, in a memory, identifiers associated with each of the one or more sidelink UEs, wherein a signal strength of the first SCIs received from the one or more sidelink UEs satisfies a threshold; performing a listen-before-talk (LBT) procedure; acquiring, based on the LBT procedure being successful, a channel occupancy time (COT); and transmitting, to the one or more sidelink UEs during the COT, COT sharing information for sharing the COT.

In an additional aspect of the disclosure, a method of wireless communication performed by a first sidelink user equipment (UE) may include receiving, from a second sidelink UE, sidelink control information (SCI), wherein the SCI indicates at least one of a channel access priority class (CAPC) associated a communication to be transmitted by the second sidelink UE or a periodicity associated with the communication to be transmitted by the second sidelink UE; performing a listen-before-talk (LBT) procedure; acquiring, based on the LBT procedure being successful, a channel occupancy time (COT); and transmitting, to the second sidelink UE during the COT, COT sharing information for sharing the COT with the second sidelink UE, wherein the COT sharing information is based on at least one of the CAPC or the periodicity.

In an additional aspect of the disclosure, a method of wireless communication performed by a first sidelink user equipment (UE) may include receiving, from a second sidelink UE, a channel occupancy time (COT) access request; performing a listen-before-talk (LBT) procedure; acquiring, based on the LBT procedure being successful, a channel occupancy time (COT); and transmitting, to the second sidelink UE during the COT, COT sharing information for sharing the COT with the second sidelink UE, wherein the COT sharing information is based on the COT access request.

In an additional aspect of the disclosure, a first sidelink user equipment (UE) may include a memory; a transceiver; and at least one processor coupled to the memory and the transceiver, wherein the first sidelink UE is configured to performing a listen-before-talk (LBT) procedure; acquiring, based on the LBT procedure being successful, a channel occupancy time (COT); and transmitting, to a second sidelink UE during the COT, COT sharing information for sharing the COT with the second sidelink UE.

In an additional aspect of the disclosure, a first sidelink user equipment (UE) may include a memory; a transceiver; and at least one processor coupled to the memory and the transceiver, wherein the first sidelink UE is configured to receive from a second sidelink UE, COT sharing information for sharing a COT with the second sidelink UE, wherein the COT sharing information includes an identifier associated with the second sidelink UE; and monitor for sidelink control information (SCI) from a third sidelink UE that includes the identifier associated with the second sidelink UE.

In an additional aspect of the disclosure, a first sidelink user equipment (UE) may include a memory; a transceiver; and at least one processor coupled to the memory and the transceiver, wherein the first sidelink UE is configured to perform a listen-before-talk (LBT) procedure; acquire, based on the LBT procedure being successful, a channel occupancy time (COT); and transmit, to a second sidelink UE during the COT, COT sharing information for sharing the COT with the second sidelink UE, wherein the LBT procedure and the COT sharing information is based on a channel access priority class (CAPC) associated with at least one of the first sidelink UE or the second sidelink UE.

In an additional aspect of the disclosure, a first sidelink user equipment (UE) may include a memory; a transceiver; and at least one processor coupled to the memory and the transceiver, wherein the first sidelink UE is configured to receive, from one or more of sidelink UEs, respective first sidelink control information (SCI); store, in a memory, identifiers associated with each of the one or more sidelink UEs, wherein a signal strength of the first SCIs received from the one or more sidelink UEs satisfies a threshold; perform a listen-before-talk (LBT) procedure; acquire, based on the LBT procedure being successful, a channel occupancy time (COT); and transmit, to the one or more sidelink UEs during the COT, COT sharing information for sharing the COT.

In an additional aspect of the disclosure, a first sidelink user equipment (UE) may include a memory; a transceiver; and at least one processor coupled to the memory and the transceiver, wherein the first sidelink UE is configured to receive, from a second sidelink UE, sidelink control information (SCI), wherein the SCI indicates at least one of a channel access priority class (CAPC) associated a communication to be transmitted by the second sidelink UE or a periodicity associated with the communication to be transmitted by the second sidelink UE; perform a listen-before-talk (LBT) procedure; acquire, based on the LBT procedure being successful, a channel occupancy time (COT); and transmit, to the second sidelink UE during the COT, COT sharing information for sharing the COT with the second sidelink UE, wherein the COT sharing information is based on at least one of the CAPC or the periodicity.

In an additional aspect of the disclosure, a first sidelink user equipment (UE) may include a memory; a transceiver; and at least one processor coupled to the memory and the transceiver, wherein the first sidelink UE is configured to receive, from a second sidelink UE, a channel occupancy time (COT) access request; perform a listen-before-talk (LBT) procedure; acquire, based on the LBT procedure being successful, a channel occupancy time (COT); and transmit, to the second sidelink UE during the COT, COT sharing information for sharing the COT with the second sidelink UE, wherein the COT sharing information is based on the COT access request.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

BRIEF DESCRIPTION OF THE DRAWINGS

FIG. 12 is a flow diagram of a communication method according to some aspects of the present disclosure.

FIG. 13 is a flow diagram of a communication method according to some aspects of the present disclosure.

FIG. 14 is a flow diagram of a communication method according to some aspects of the present disclosure.

FIG. 15 is a flow diagram of a communication method according to some aspects of the present disclosure.

FIG. 16 is a flow diagram of a communication method according to some aspects of the present disclosure.

DETAILED DESCRIPTION

Figure 1:
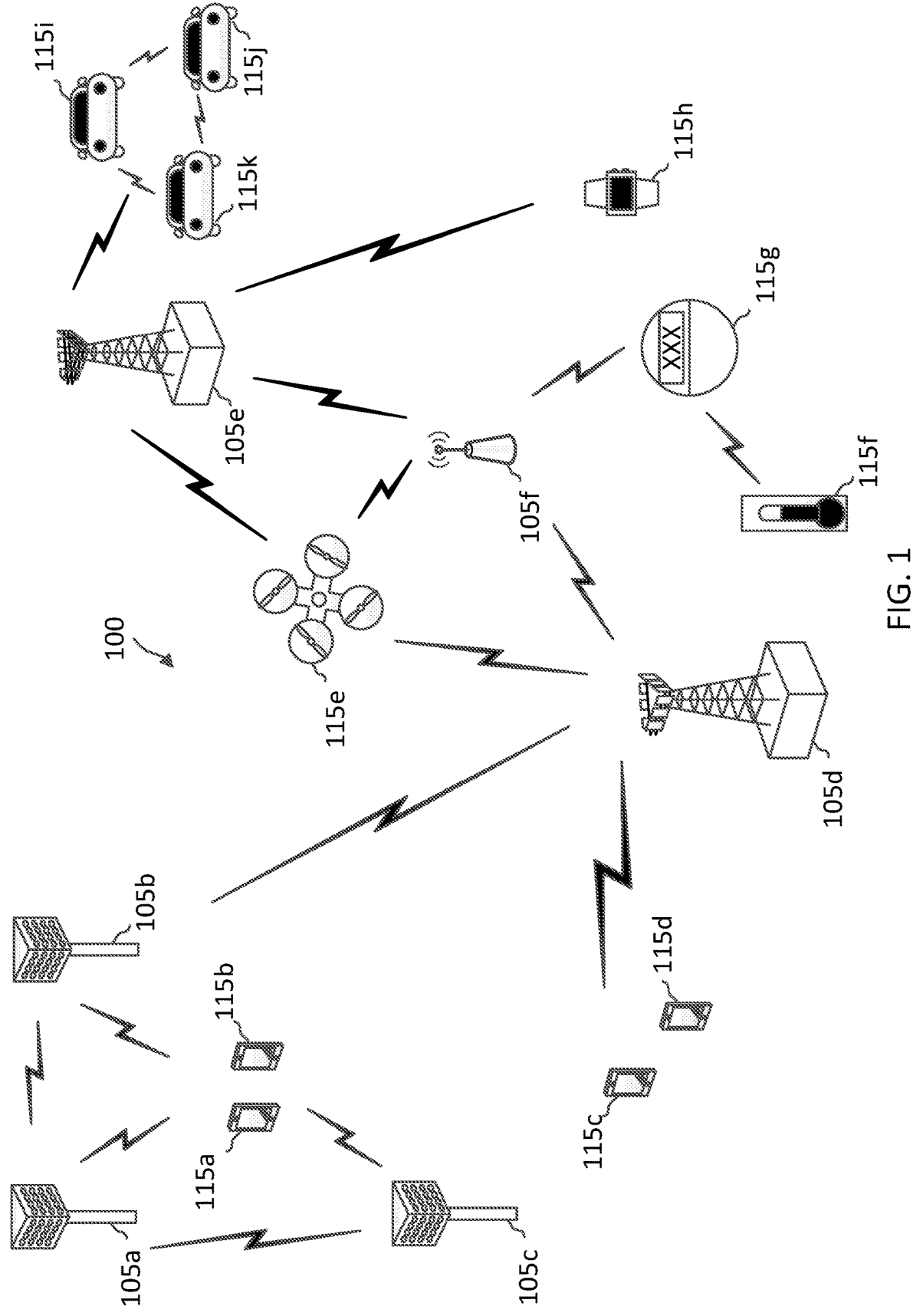
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The deployment of NR over an unlicensed spectrum is referred to as NR-unlicensed (NR-U). Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. Additionally, NR-U can also be deployed over 2.4 GHz unlicensed bands, which are currently shared by various radio access technologies (RATs), such as IEEE 802.11 wireless local area network (WLAN) or WiFi and/or license assisted access (LAA). Sidelink communications may benefit from utilizing the additional bandwidth available in an unlicensed spectrum. However, channel access in a certain unlicensed spectrum may be regulated by authorities. For instance, some unlicensed bands may impose restrictions on the power spectral density (PSD) and/or minimum occupied channel bandwidth (OCB) for transmissions in the unlicensed bands. For example, the unlicensed national information infrastructure (UNIT) radio band has a minimum OCB requirement of about at least 70 percent (%).

Some sidelink systems may operate over a 20 MHz bandwidth, e.g., for listen before talk (LBT) based channel accessing, in an unlicensed band. ABS may configure a sidelink resource pool over one or multiple 20 MHz LBT sub-bands for sidelink communications. A sidelink resource pool is typically allocated with multiple frequency subchannels within a sidelink band width part (SL-BWP) and a sidelink UE may select a sidelink resource (e.g., one or multiple subchannels in frequency and one or multiple slots in time) from the sidelink resource pool for sidelink communication.

Deployment of communication systems, such as 5G new radio (NR) systems, may be arranged in multiple manners with various components or constituent parts. In a NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

ABS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform back-haul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical com-munications with ultra-reliable and redundant links for mis-sion critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115f (e.g., a ther-mometer), the UE 115g (e.g., smart meter), and UE 115h (e.g., wearable device) may communicate through the net-work 100 either directly with BSs, such as the small cell BS 105f, and the macro BS 105e, or in multi-hop configurations by communicating with another user device which relays its information to the network, such as the UE 115f communi-cating temperature measurement information to the smart meter, the UE 115g, which is then reported to the network through the small cell BS 105f. In some aspects, the UE 115h may harvest energy from an ambient environment associated with the UE 115h. The network 100 may also provide additional network efficiency through dynamic, low-latency TDD/FDD communications, such as vehicle-to-vehicle (V2V), vehicle-to-everything (V2X), cellular-vehicle-to-ev-erything (C-V2X) communications between a UE 115i, 115j, or 115k and other UEs 115, and/or vehicle-to-infrastructure (V21) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the trans-mission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the commu-nications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control infor-mation may include resource assignments and protocol controls. Data may include protocol data and/or operational data. In some instances, the BSs 105 and the UEs 115 may communicate using self-contained subframes. A self-con-tained subframe may include a portion for DL communica-tion and a portion for UL communication. A self-contained subframe can be DL-centric or UL-centric. A DL-centric subframe may include a longer duration for DL communi-cation than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

The network 100 may be designed to enable a wide range of use cases. While in some examples a network 100 may utilize monolithic base stations, there are a number of other architectures which may be used to perform aspects of the present disclosure. For example, a BS 105 may be separated into a remote radio head (RRH) and baseband unit (BBU). BBUs may be centralized into a BBU pool and connected to RRHs through low-latency and high-bandwidth transport links, such as optical transport links. BBU pools may be cloud-based resources. In some aspects, baseband processing is performed on virtualized servers running in data centers rather than being co-located with a BS 105. In another example, based station functionality may be split between a remote unit (RU), distributed unit (DU), and a central unit (CU). An RU generally performs low physical layer functions while a DU performs higher layer functions, which may include higher physical layer functions. A CU performs the higher RAN functions, such as radio resource control (RRC).

For simplicity of discussion, the present disclosure refers to methods of the present disclosure being performed by base stations, or more generally network entities, while the functionality may be performed by a variety of architectures other than a monolithic base station. In addition to disaggregated base stations, aspects of the present disclosure may also be performed by a centralized unit (CU), a distributed unit (DU), a radio unit (RU), a Near-Real Time (Near-RT) RAN Intelligent Controller (RIC), a Non-Real Time (Non-RT) RIC, integrated access and backhaul (IAB) node, a relay node, a sidelink node, etc.

In some aspects, the UE 115*i* may perform a listen-before-talk (LBT) procedure. The UE 115*i* may acquire a channel occupancy time (COT) based on the LBT procedure being successful. The UE 115*i* may transmit COT sharing information to the UE 115*j* during the COT for sharing the COT with the UE 115*j*.

Figure 2:
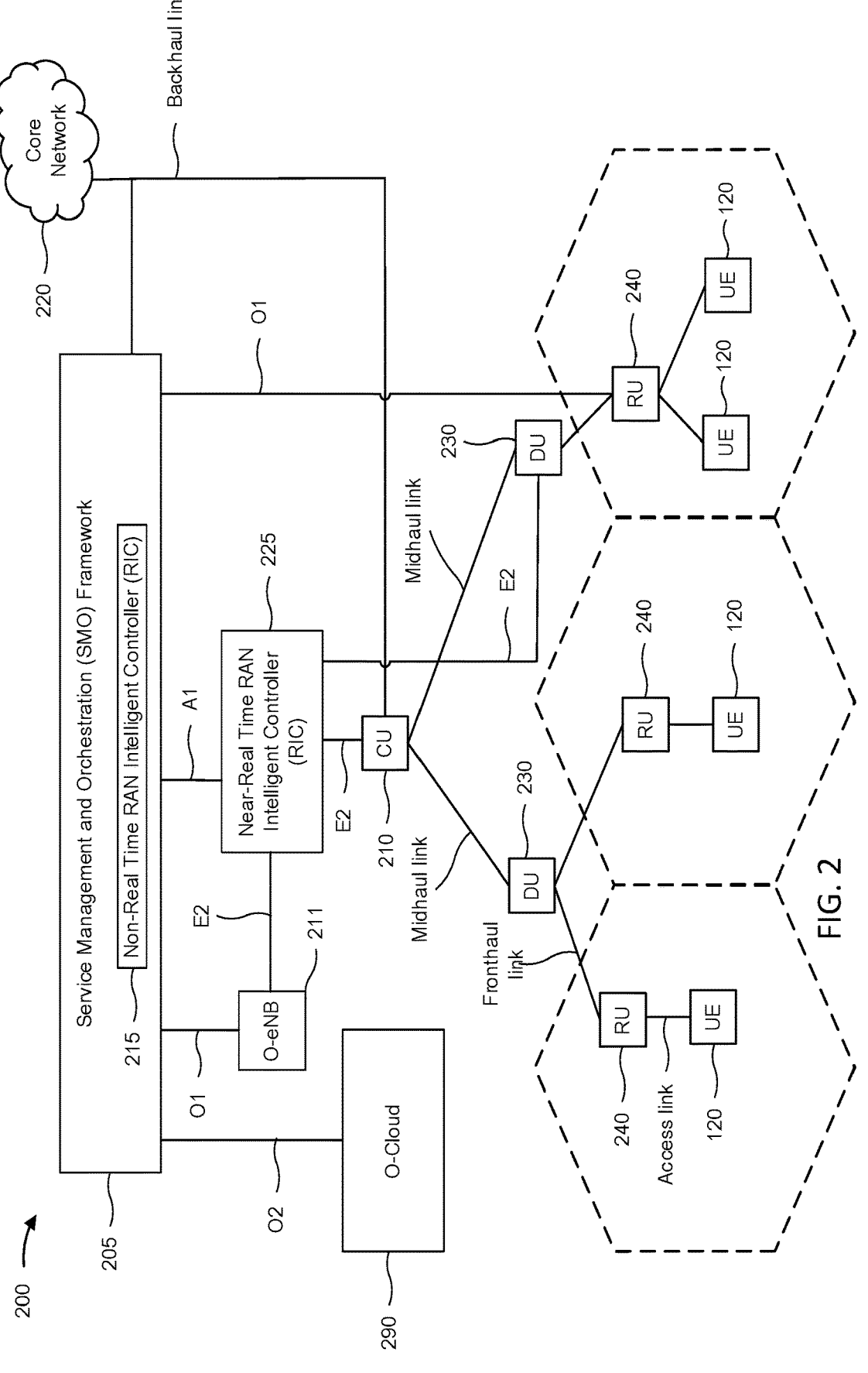
FIG. 2 illustrates an example disaggregated base station architecture according to some aspects of the present disclosure

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 120 via one or more radio frequency (RF) access links. In some implementations, the UE 120 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 120. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and opti-mization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as AI policies).

In some aspects, a first UE 120 may perform a listen-before-talk (LBT) procedure. The first UE 120 may acquire a channel occupancy time (COT) based on the LBT procedure being successful. The first UE 120 may transmit COT sharing information to a second UE 120 during the COT for sharing the COT with the second UE 120.

Figure 3:
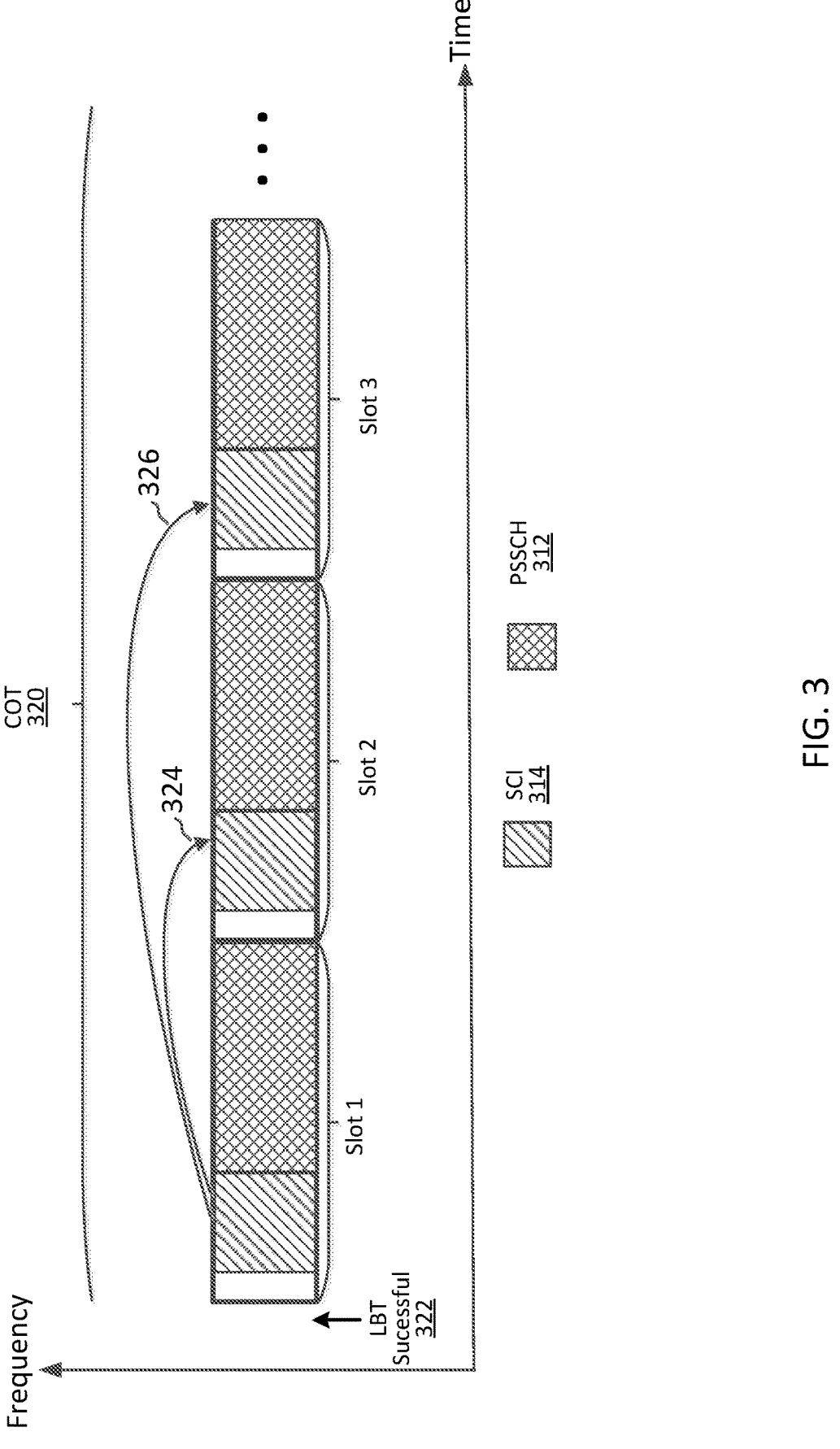
FIG. 3 illustrates an example of COT sharing resources according to some aspects of the present disclosure.

FIG. 3 illustrates an example of COT sharing resources according to some aspects of the present disclosure. In FIG. 3, the x-axis represents time in some arbitrary units and the Y axis represents frequency in some arbitrary units. In some aspects, a first sidelink UE (e.g., the UE 115, the UE 120, or the UE 900) may perform a listen-before-talk (LBT) procedure to gain access to the COT 320. The first sidelink UE may perform the LBT procedure or other clear channel assessment (CCA) on one or more sidelink communication channels. In some instances, the first sidelink UE may perform an LBT procedure or other CCA to gain access to the COT 320 in an unlicensed (e.g., shared) frequency spectrum. For example, the first sidelink UE may perform a category 1 LBT, a category 2 LBT, a category 3 LBT, and/or a category 4 LBT to gain access to the COT 320 in an unlicensed frequency spectrum. In some aspects, the first sidelink UE may perform the LBT in one or more time resources, spatial resources, and/or frequency resources. The frequency resources may include a frequency spectrum, a frequency band, a frequency sub-band, a frequency subchannel, resource elements, resource blocks, and/or a frequency interlace. The time resources may include slot(s), sub-slot (s), symbol(s), subframe(s), or any other suitable time resources. In some aspects, the first sidelink UE may perform the LBT for one or more directional beams (e.g., a beam in the direction of the UE that the first sidelink UE intends to transmit a communication to and/or receive a communication from).

The first sidelink UE may acquire the COT 320 based on the LBT procedure 322 being successful. The first sidelink UE may acquire the COT 320 to transmit a communication to another sidelink UE. Additionally or alternatively, the first sidelink UE may share the COT with other sidelink UEs.

The first sidelink UE may transmit COT sharing information to a second sidelink UE (e.g., the UE 115, the UE

120, or the UE 900) for sharing the COT 320 with the second sidelink UE. The first sidelink UE may transmit the COT sharing information to the second sidelink UE during the COT 320 as indicated by arrow 324. The COT sharing information may include a COT resource allocation that indicates resources the second sidelink UE may use to share the COT 320. In some aspects, the first sidelink UE may transmit the COT sharing information to the second sidelink UE and other sidelink UEs (e.g., a group of sidelink UEs, a set of sidelink UEs). The first sidelink UE may transmit the COT sharing information including resource allocations to the set of sidelink UEs to share the COT with the set of sidelink UEs. For example, the first sidelink UE may transmit the COT sharing information to a third sidelink UE as indicated by arrow 326.

In some aspects, the first sidelink UE may transmit the COT sharing information via sidelink control information 314 (e.g., SCI-1, SCI-2), an RRC message, a PSCCH message, a PSSCH 312 message, or other suitable communication. For example, the first sidelink UE may transmit the COT sharing information in a SL_COT_SharingInformation field via sidelink control information 2 (SCI-2).

In some aspects, the COT sharing information may include information (e.g., parameters, resources, settings, commands, etc.) to enable the first sidelink UE to share the COT 320 with other sidelink UEs (e.g., the second sidelink UE). Sharing the COT 320 with other sidelink UEs may enable the other sidelink UEs to transmit and/or receive communications during the COT 320 in an efficient and coordinated fashion. In some aspects, the COT sharing information may include identifiers associated with the set of sidelink UEs that share the COT 320 The sidelink UE identifiers may include layer one identifiers unique to each sidelink UE that shares the COT.

In some aspects, the COT sharing information may include a time resource allocation associated with the COT sharing. For example, the time resource allocation may include a COT start time, a COT end time, and/or a COT duration. The time resource allocation may include time resources (e.g., slots, sub-slots, symbols, frames, etc.) allocated to the set of sidelink UEs that share the COT 320. For example, the time resource allocation may indicate index(s) indicating starting slot(s) and/or sub-slot(s) allocated to the set of sidelink UEs. The time resource allocation may indicate a number of time resources (e.g., a number of slots, sub-slots, and/or symbols) allocated to the set of sidelink UEs. For example, the time resource allocation may indicate slot 1 is allocated to the first sidelink UE, slot 2 is allocated to the second sidelink UE, and slot 3 is allocated to the third sidelink UE. The first sidelink UE may indicate the time resource allocation(s) to the sidelink UEs sharing the COT in a time domain resource allocation (TDRA) via SCI-1.

In some aspects, the time resource allocation included in the COT sharing information may indicate time resources associated with sharing the COT relative to when the LBT procedure 322 is successful. For example, if the first sidelink UE performs a successful LBT 322 at slot i, then the time resource allocation may indicate the resources associated with COT sharing relative to slot i. In some instances, the time resource allocation may indicate the resources associated with COT sharing as a number (e.g., an integer number) of slots, a number of sub-slots, or a number of symbols from slot i (e.g., the end of slot i and/or the beginning of slot i). In some aspects, the time resource allocation may indicate the resources associated with COT sharing as a time value (e.g., number of milliseconds) relative to slot i.

In some aspects, the COT sharing information may indicate a COT duration. The COT duration may indicate a time period for sidelink UEs to share the COT 320 during which the first sidelink UE and the COT sharing UE(s) may communicate. The COT duration may start from a successful LBT 322 by the first sidelink UE. In some aspects, the COT duration may be based on an amount of data (e.g., transport blocks) the first sidelink UE and/or the COT sharing UE(s) need to transmit. A larger amount of data may require a longer COT duration as compared to a smaller amount of data. The COT duration may be indicated to the COT sharing UE(s) as a number of slots, a number of sub-slots, a number of symbols, a number of milliseconds, or a combination thereof. In some aspects, the COT duration may be indicated as a remaining COT duration. For example, the COT duration may be a duration of x slots. The first sidelink UE may use y slots of the x slots to transmit sidelink communications. The remaining COT duration may be indicated to the second sidelink UE and/or other COT sharing sidelink UEs as x-y slots.

In some aspects, the COT sharing information may include a frequency resource allocation (e.g., frequency range(s)) associated with the COT sharing. For example, the frequency resource allocation may include a starting frequency (e.g., a starting frequency subchannel index, a starting frequency band, a starting frequency interlace). The frequency resource allocations may include an ending frequency (e.g., an ending subchannel, an ending frequency band). The frequency resource allocations may include a frequency interlace (e.g., a frequency interlace index, indexes of subchannels). The frequency resource allocation may indicate frequency resources allocated to the set of sidelink UEs that share the COT 320 with the first sidelink UE. The first sidelink UE may indicate the frequency resource allocation(s) to the sidelink UEs sharing the COT 320 in a frequency domain resource allocation (FDRA) via SCI-1.

In some aspects, the first sidelink UE may transmit a flag indicating the first sidelink UE is sharing the COT 320. In this regard, the first sidelink UE may transmit the flag via SCI 314 (e.g., SCI-1, SCI-2) indicating the first sidelink UE is sharing the COT 320. The flag may include a single bit (e.g., 0 or 1) indicator, a multi-bit indicator, a code point, or other indicator to indicate the other sidelink UEs (e.g., the sidelink UEs receiving the flag) may share the COT 320.

In some aspects, the first sidelink UE may transmit the flag in SCI-2 via a PSSCH 312. The SCI-2 may include destination identifier(s) associated with the second sidelink UE and other sidelink UEs indicating the first sidelink UE shares the COT 320 with the second sidelink UE and the other sidelink UEs. The sidelink UEs in proximity to the first sidelink UE that receive and decode the SCI-2 may share the COT 320 with the first sidelink UE if the SCI-2 includes an identifier that matches the identifier associated with the receiving sidelink UE.

Figure 4:
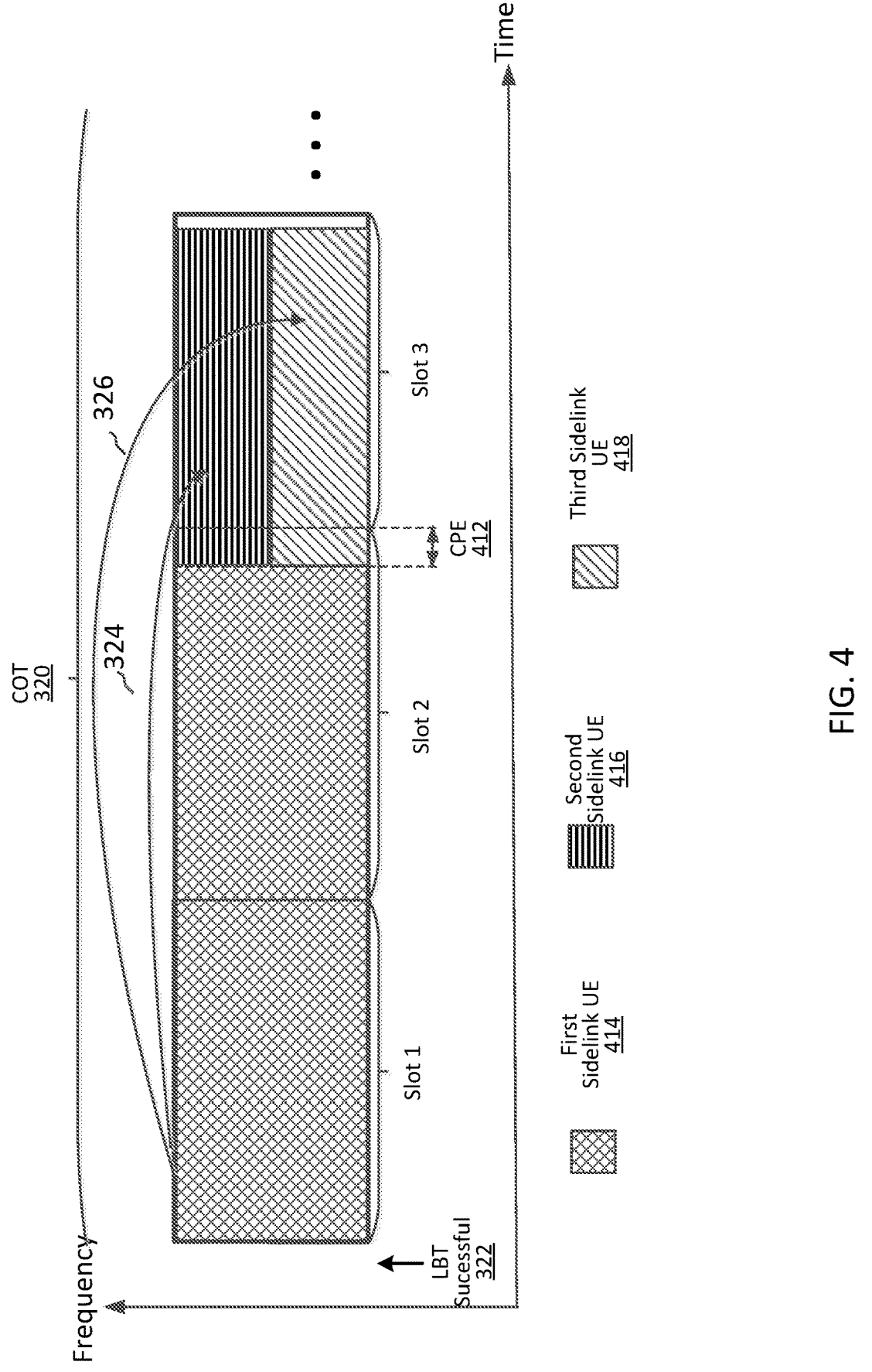
FIG. 4 illustrates an example of frequency division multiplexing of COT sharing resources according to some aspects of the present disclosure.

FIG. 4 illustrates an example of COT sharing using frequency division multiplexed resources according to some aspects of the present disclosure. In FIG. 4, the x-axis represents time in some arbitrary units and the Y axis represents frequency in some arbitrary units. In some aspects, a first sidelink UE (e.g., the UE 115, the UE 120, or the UE 900) may perform a listen-before-talk (LBT) procedure 322 to gain access to the COT 320. The first sidelink UE may perform the LBT procedure 322 or other clear channel assessment (CCA) on one or more sidelink communication channels. In some instances, the first sidelink UE may perform an LBT procedure 322 or other CCA to gain access to the COT 320 in an unlicensed (e.g., shared) frequency spectrum. For example, the first sidelink UE may perform a category 1 LBT, a category 2 LBT, a category 3 LBT, and/or a category 4 LBT to gain access to the COT 320 in an unlicensed frequency spectrum.

The first sidelink UE may acquire the COT 320 based on the LBT procedure 322 being successful. The first sidelink UE may acquire the COT 320 to transmit a communication to another sidelink UE. Additionally or alternatively, the first sidelink UE may share the COT with other sidelink UEs.

The first sidelink UE may transmit COT sharing information to a second sidelink UE (e.g., the UE 115, the UE 120, or the UE 900) for sharing the COT 320 with the second sidelink UE. The first sidelink UE may transmit the COT sharing information in slot 1 to the second sidelink UE as indicated by arrow 324. The COT sharing information may include a COT resource allocation that indicates resources the second sidelink UE may use to share the COT 320. In some aspects, the first sidelink UE may transmit the COT sharing information to the second sidelink UE and other sidelink UEs (e.g., a group of sidelink UEs, a set of sidelink UEs). The first sidelink UE may transmit the COT sharing information including resource allocations to the set of sidelink UEs to share the COT with the set of sidelink UEs. For example, the first sidelink UE may transmit the COT sharing information to a third sidelink UE as indicated by arrow 326.

In some aspects, the COT sharing information may include a time resource allocation associated with the COT sharing. For example, the time resource allocation may include a COT start time, a COT end time, and/or a COT duration. The time resource allocation may include time resources (e.g., slots, sub-slots, symbols, frames, etc.) allocated to the set of sidelink UEs that share the COT. For example, the time resource allocation may indicate index(s) indicating starting slot(s) and/or sub-slot(s) allocated to the set of sidelink UEs. The time resource allocation may indicate a number of time resources (e.g., a number of slots, sub-slots, and/or symbols) allocated to the set of sidelink UEs. For example, the time resource allocation 414 may indicate slots 1 and 2 are allocated to the first sidelink UE and slot 3 is allocated to the second and third sidelink UEs. The first sidelink UE may indicate the time resource allocation(s) to the sidelink UEs sharing the COT in a time domain resource allocation (TDRA) via SCI-1.

In some aspects, the first sidelink UE may transmit the COT sharing information to a second and third sidelink UE for sharing the COT 320. The COT sharing information may indicate frequency resources 416 allocated to the second sidelink UE frequency division multiplexed with frequency resources 418 allocated to the third sidelink UE. In some aspects, the COT sharing information may indicate the same cyclic prefix extension (CPE) length 412 allocated to the second sidelink UE and the third sidelink UE. By having the same CPE length 412, the second and third sidelink UEs may each transmit a sidelink communication at the same in slot 3 but the sidelink transmissions may not interfere with one another due to the second and third sidelink UEs transmitting in different frequency ranges 416 and 418. In some aspects, the second and third sidelink UEs may perform an LBT (e.g., CAT 1 LBT, CAT 2 LBT) prior to transmitting in slot 3 based on the time gap between the end of the first sidelink UE's transmission in slot 2 and the CPE length 412 indicated by the COT sharing information.

Figure 5:
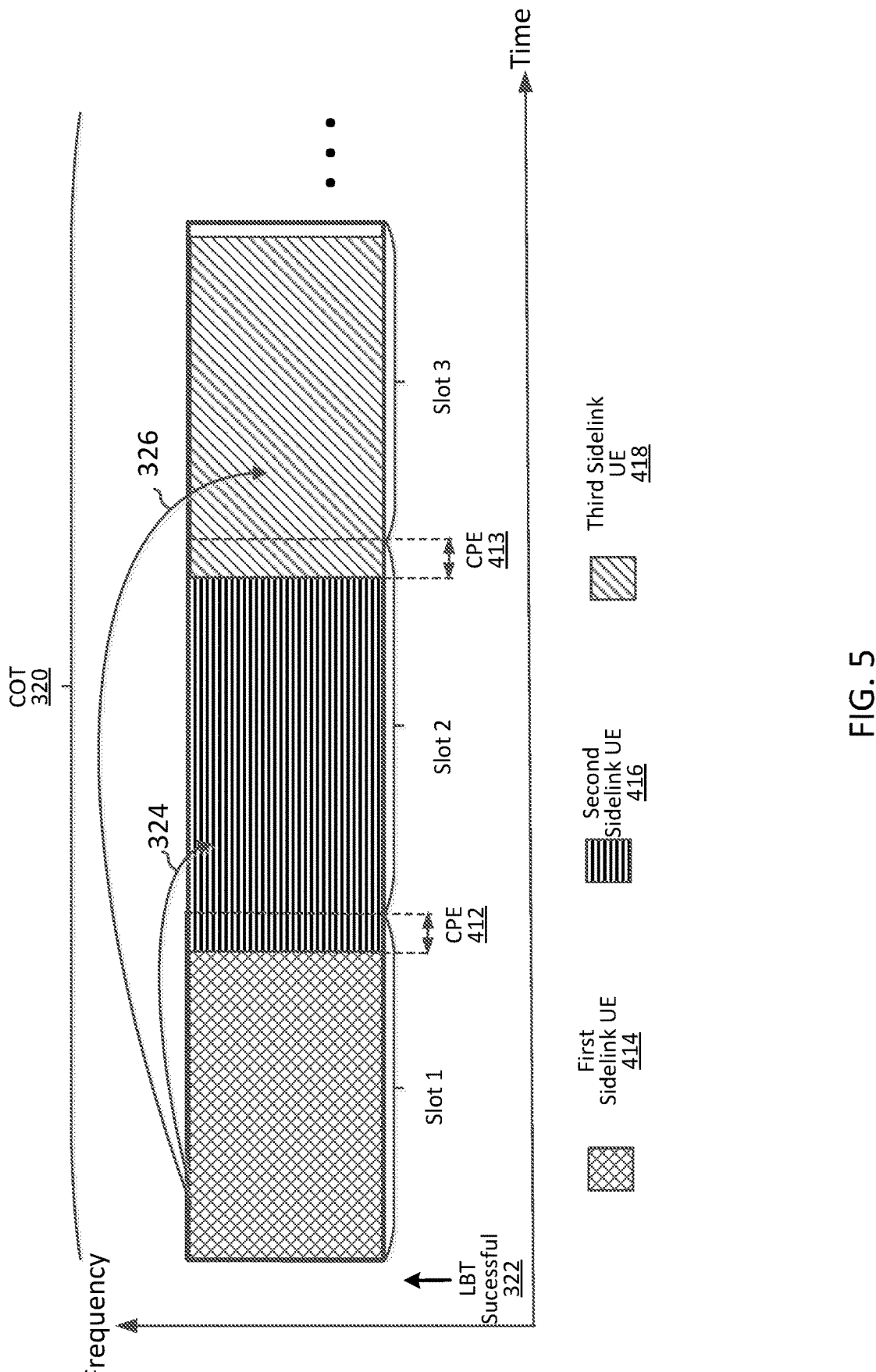
FIG. 5 illustrates an example of time division multiplexing of COT sharing resources according to some aspects of the present disclosure.

FIG. 5 illustrates an example of COT sharing using time division multiplexed resources according to some aspects of the present disclosure. In FIG. 5, the x-axis represents time in some arbitrary units and the Y axis represents frequency in some arbitrary units. In some aspects, a first sidelink UE (e.g., the UE 115, the UE 120, or the UE 900) may perform a listen-before-talk (LBT) procedure to gain access to the COT 320. The first sidelink UE may perform the LBT procedure or other clear channel assessment (CCA) on one or more sidelink communication channels. In some instances, the first sidelink UE may perform an LBT procedure or other CCA to gain access to the COT 320 in an unlicensed (e.g., shared) frequency spectrum. For example, the first sidelink UE may perform a category 1 LBT, a category 2 LBT, a category 3 LBT, and/or a category 4 LBT to gain access to the COT 320 in an unlicensed frequency spectrum.

The first sidelink UE may acquire the COT 320 based on the LBT procedure 322 being successful. The first sidelink UE may acquire the COT 320 to transmit a communication to another sidelink UE. Additionally or alternatively, the first sidelink UE may share the COT with other sidelink UEs.

The first sidelink UE may transmit COT sharing information to a second sidelink UE (e.g., the UE 115, the UE 120, or the UE 900) for sharing the COT 320 with the second sidelink UE. The first sidelink UE may transmit the COT sharing information in slot 1 to the second sidelink UE as indicated by arrow 324. The first sidelink UE may transmit the COT sharing information to a third sidelink UE as indicated by arrow 326.

In some aspects, the COT sharing information may include a time resource allocation associated with the COT sharing. For example, the time resource allocation may include a COT start time, a COT end time, and/or a COT duration. The time resource allocation may indicate slot 1 is allocated to the first sidelink UE, slot 2 is allocated to the second sidelink UE, and slot 3 is allocated to the third sidelink UE. The first sidelink UE may indicate the time resource allocation(s) to the sidelink UEs sharing the COT in a time domain resource allocation (TDRA) via SCI-1.

The COT sharing information may indicate time resources allocated to the second sidelink UE time division multiplexed with time resources allocated to the third sidelink UE. For example, the first sidelink UE may transmit in slot 1, the second sidelink UE may transmit in slot 2, and the third sidelink UE may transmit in slot 3. Slots 1, 2, and 3 may be contiguous or non-contiguous. The first, second, and third sidelink UEs may transmit in the same frequency range(s) or different frequency range(s). In some aspects, the COT sharing information may indicate the same CPE length 412, 413 allocated to the second sidelink UE and the third sidelink UE respectively. In some aspects, the COT sharing information may indicate different CPE lengths 412, 413 allocated to the second sidelink UE and the third sidelink UE. The second and third sidelink UEs may each transmit a sidelink communication in their respective time allocations and not interfere with one another due to transmitting at different times. In some aspects, the second and third sidelink UE may perform an LBT (e.g., CAT 1 LBT, CAT 2 LBT) based on the time gap between the end of the first sidelink UE's transmission and the CPE length 412, 413 indicated for the second and third sidelink UEs respectively.

Figure 6:
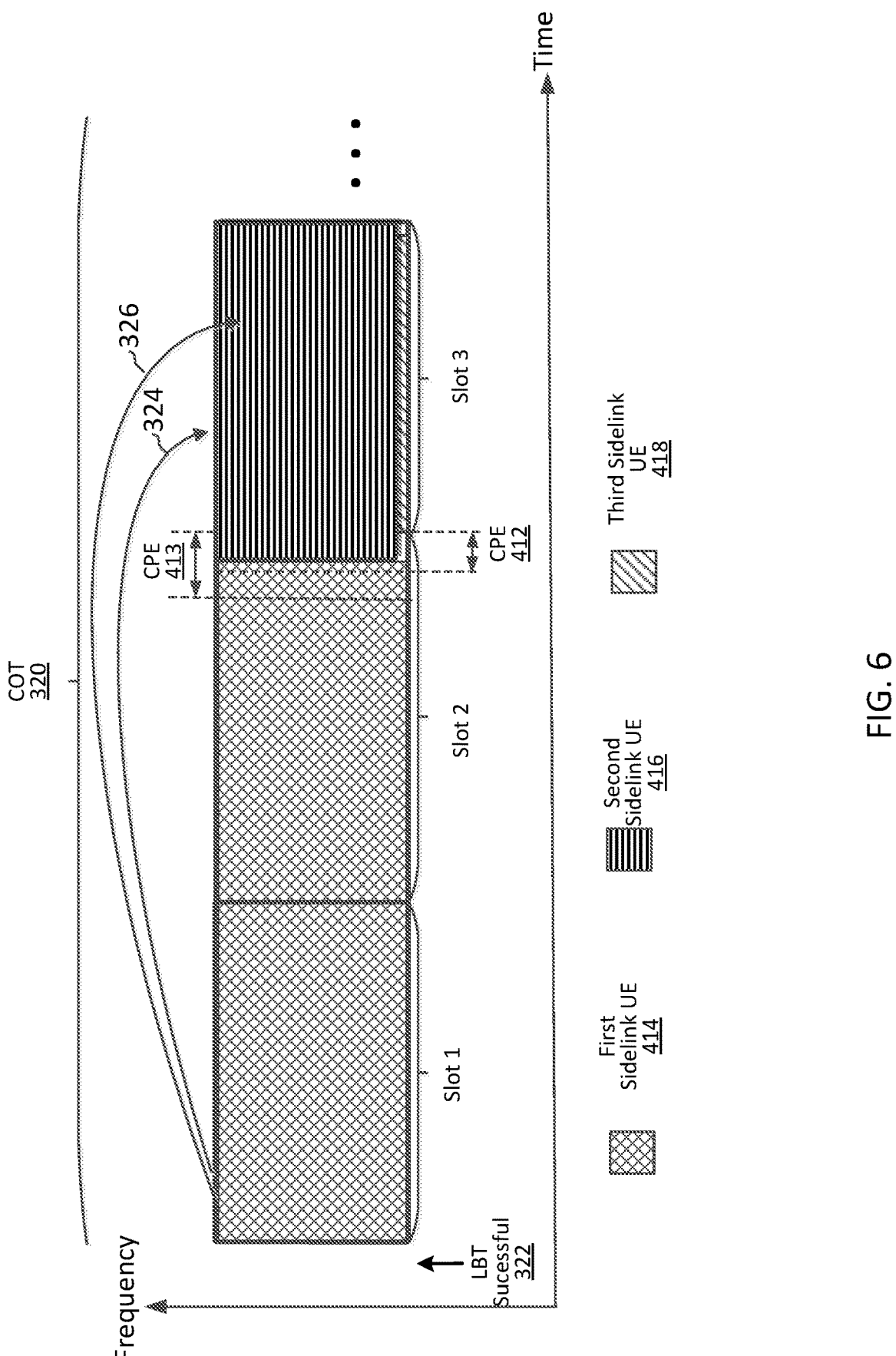
FIG. 6 illustrates an example of overlapping COT sharing resources according to some aspects of the present disclosure.

FIG. 6 illustrates an example of COT sharing using overlapping resources according to some aspects of the present disclosure. In FIG. 6, the x-axis represents time in some arbitrary units and the Y axis represents frequency in some arbitrary units. In some aspects, a first sidelink UE (e.g., the UE 115, the UE 120, or the UE 900) may perform a listen-before-talk (LBT) procedure to gain access to the COT 320. For example, the first sidelink UE may perform a category 1 LBT, a category 2 LBT, a category 3 LBT, and/or a category 4 LBT to gain access to the COT 320 in an unlicensed frequency spectrum.

The first sidelink UE may acquire the COT 320 based on the LBT procedure 322 being successful. The first sidelink UE may acquire the COT 320 to transmit a communication to another sidelink UE. Additionally or alternatively, the first sidelink UE may share the COT with other sidelink UEs.

The first sidelink UE may transmit COT sharing information to a second sidelink UE (e.g., the UE 115, the UE 120, or the UE 900) for sharing the COT 320 with the second sidelink UE. The first sidelink UE may transmit the COT sharing information in slot 1 to the second sidelink UE as indicated by arrow 324. The first sidelink UE may transmit the COT sharing information to a third sidelink UE as indicated by arrow 326.

The COT sharing information may indicate the same time resources and frequency resources allocated to the second and third sidelink UEs. The time and/or frequency resources allocated to the second and third sidelink UEs may completely overlap or may partially overlap. In some aspects, the COT sharing information may schedule the second and third sidelink UEs to transmit on the same slot boundary between slots 2 and 3. The second and third sidelink UEs may be allocated different CPE lengths. For example, the second sidelink UE may be allocated CPE length 413 and the third sidelink UE may be allocated CPE length 412. CPE length 413 may be longer than CPE length 412. Since the longer CPE length 413 allows the second sidelink UE to transmit earlier in time, the second sidelink UEs transmission may block the third sidelink UEs transmission. The CPE length may be allocated based on a priority (e.g., CAPC) associated the sidelink UEs transmission. For example, the second and third sidelink UEs may indicate to the first sidelink UE a priority associated with their respective transmissions. The first sidelink UE may assign the CPE length based on the relative priorities. By assigning overlapping time and frequency resources to the second and third sidelink UEs, the probability of retaining the COT 320 is increased. For example, if the second sidelink UE having the longer CPE length 413 does not transmit in slot 3, the third sidelink UE with the shorter CPE length 412 may transmit in slot 3. By maintaining a transmission in the COT 320, the probability of another device (e.g., a WiFi™ device, a non-COT sharing UE) gaining the COT 320 is reduced. Although the above example discusses two sidelink UEs allocated overlapping resources, the present disclosure is not so limited and any number of sidelink UEs may be allocated overlapping resources.

Figure 7:
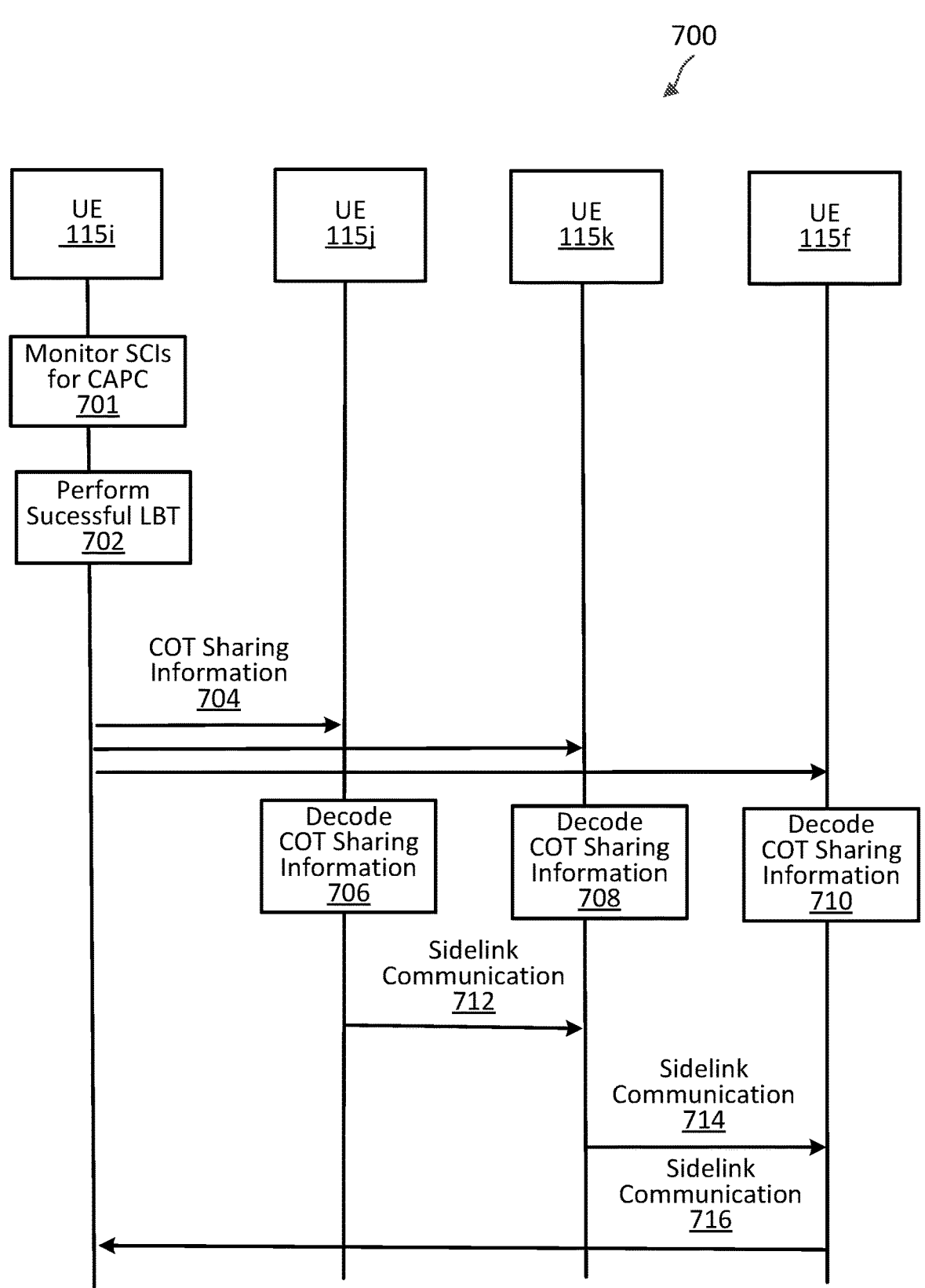
FIG. 7 is a signaling diagram of a wireless communication method according to some aspects of the present disclosure.

FIG. 7 is a signaling diagram of a wireless communication method 700 according to some aspects of the present disclosure. Actions of the communication method 700 can be executed by a computing device (e.g., a processor, processing circuit, and/or other suitable component) of a communication device or other suitable means for performing the actions. For example, a wireless communication device, such as the UE 115, UE 120, or UE 900, may utilize one or more components, such as the processor 902, the memory 904, the COT sharing module 908, the transceiver 910, the modem 912, and the one or more antennas 916, to execute aspects of method 700.

At action 701, the UE 115*i* may monitor SCIs for UE identifiers and CAPC from neighboring sidelink UEs 115*j*, 115*k*, and 115*f*. The UE 115*i* may store identifiers and CAPC associated with each of the neighboring sidelink UEs 115*j*, 115*k*, and 115*f* in a memory (e.g., the memory 904). The stored UE identifiers may serve as a neighbor list that includes sidelink UEs in proximity to the UE 115*i*. The UE 115*i* may measure a signal strength (e.g., RSRP, RSSI) associated with the SCI(s). When the measured signal strength of the received SCI satisfies a threshold, the UE 115*i* may store the sidelink UE identifier (e.g., source ID) associated with the SCI.

At action 702, the UE 115*i* may perform a successful LBT. The UE 115*i* may perform a category 1 LBT, a category 2 LBT, a category 3 LBT, and/or a category 4 LBT to gain access to the COT in an unlicensed frequency spectrum.

At action 704, the UE 115*i* may transmit COT sharing information via sidelink control information (e.g., SCI-1, SCI-2), an RRC message, a PSCCH message, a PSSCH 312 message, or other suitable communication to the UEs 115*j*, 115*k*, and 115*f*. For example, the first sidelink UE may transmit the COT sharing information in a SL_COT_SharingInformation field via sidelink control information 2 (SCI-2). In some aspects, the COT sharing information may include information (e.g., parameters, resources, settings, commands, etc.) to enable the UE 115*i* to share the COT with the UEs 115*j*, 115*k*, and 115*f*. Sharing the COT with other sidelink UEs may enable the other sidelink UEs to transmit and/or receive communications during the COT in an efficient and coordinated fashion. In some aspects, the COT sharing information may include identifiers associated with the set of sidelink UEs that share the COT. The sidelink UE identifiers may include layer one identifiers unique to each sidelink UE that shares the COT.

At action 706, the UE 115*j* may decode the COT sharing information received from the UE 115*i*. The COT sharing information may include a COT resource allocation that indicates resources the UE 115*j* may use to share the COT.

At action 708, the UE 115*k* may decode the COT sharing information received from the UE 115*i*. The COT sharing information may include a COT resource allocation that indicates resources the UE 115*k* may use to share the COT.

At action 710, the UE 115*f* may decode the COT sharing information received from the UE 115*i*. The COT sharing information may include a COT resource allocation that indicates resources the UE 115*f* may use to share the COT.

At action 712, the UE 115*j* may transmit a sidelink communication to the UE 115*k* in the resources allocated in the COT sharing information. The UE 115*j* may transmit the sidelink communication based on a priority (e.g., CAPC) associated with the UE 115*j*. For example, the UE 115*j* may have a lower CAPC value indicating higher priority than the UE 115*k*. Therefore the UE 115*j* may transmit before the UE 115*k*.

At action 714, the UE 115*k* may transmit a sidelink communication to the UE 115*f* in the resources allocated in the COT sharing information. The UE 115*k* may transmit the sidelink communication based on a priority (e.g., CAPC) associated with the UE 115*k*. For example, the UE 115*k* may have a lower CAPC value indicating higher priority than the UE 115*f*. Therefore the UE 115*k* may transmit before the UE 115*f*.

At action 716, the UE 115*f* may transmit a sidelink communication to the UE 115*i* in the resources allocated in the COT sharing information. The UE 115*f* may transmit the sidelink communication based on a priority (e.g., CAPC) associated with the UE 115*f*.

Figure 8:
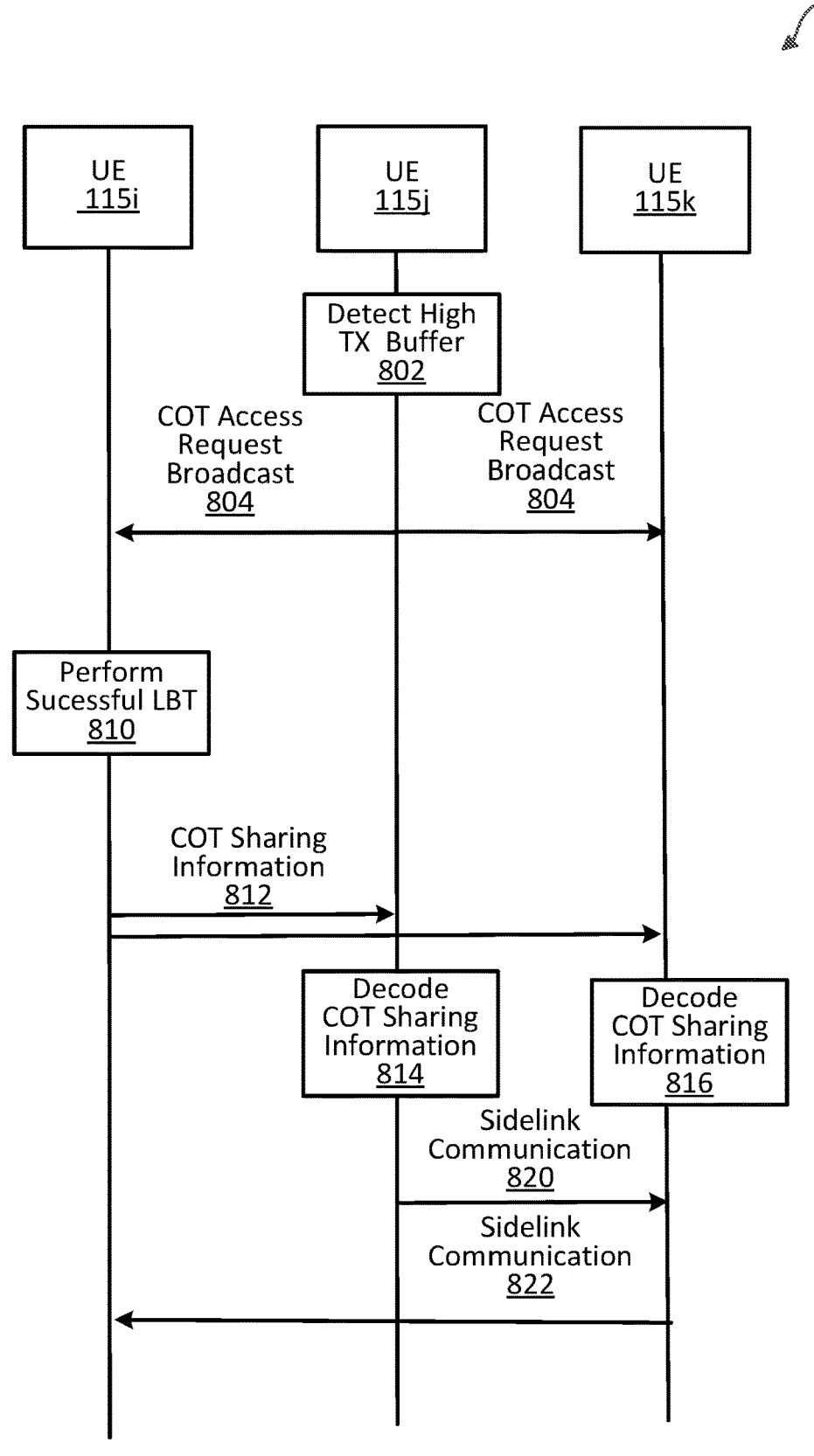
FIG. 8 is a signaling diagram of a wireless communication method according to some aspects of the present disclosure.

FIG. 8 is a signaling diagram of a wireless communication method 800 according to some aspects of the present disclosure. Actions of the communication method 800 can be executed by a computing device (e.g., a processor, processing circuit, and/or other suitable component) of a communication device or other suitable means for performing the actions. For example, a wireless communication device, such as the UE 115, UE 120, or UE 900, may utilize one or more components, such as the processor 902, the memory 904, the COT sharing module 908, the transceiver 910, the modem 912, and the one or more antennas 916, to execute aspects of method 800.

At action 802, the UE 115*j* may detect a transmit buffer exceeding a threshold. The transmit buffer may exceed the threshold based on the UE 115*j* not having access to a COT in order to transmit the data in the buffer.

At action 804, the UE 115*j* may broadcast a COT access request to the UE 115*i* and the UE 115*k* requesting to share a COT. Any sidelink UE receiving the COT access request may act as the COT initiator to coordinate the COT sharing.

In some aspects, the UE 115*j* may transmit the COT access request based on a buffer status associated with the UE 115*j*. For example, when a transmit buffer of the UE 115*j* satisfies a threshold (e.g., exceeds a threshold) at action 802, the UE 115*j* may transmit the COT access request. The UE 115*j* may transmit the COT access request during a current COT that requests access in a later COT. The COT access request may include time/frequency resources for the UE 115*j* to share the COT. The requested time/frequency resources may be based on a priority (e.g., CAPC) associated with the buffered data and/or an amount of buffered data to be transmitted. The COT access request may include a CAPC associated with the buffered data. The COT access request may include an expiration time indicating when the COT access request expires. In this regard, when the UE 115*j* has a large amount of buffered data to transmit, the COT access request may indicate no expiration.

In some aspects, the UE 115*j* may transmit the COT access request via a PSSCH, a PSCCH, a PSFCH, SCI, a MAC CE message, a unicast message, a groupcast message, or other suitable communication. In some aspects, the UE 115*j* may broadcast the COT access request to request COT sharing from any neighboring sidelink UE that receives the broadcasted request. In some aspects, the UE 115*j* may transmit the COT access request via a flag (e.g., a single bit 0 or 1) or via a multibit indicator. For example, a legacy PSFCH may carry a single bit indicator indicating the COT access request. The UE 115*i* and the UE 115*k* may interpret the single bit PSFCH as a COT access request when there is no mapping of the PSFCH to a PSSCH.

In some aspects, the UE 115*i* may transmit a COT trigger message to the UE 115*j*. The UE 115*j* may transmit the COT access request in response to the COT trigger message. In some aspects, the UE 115*j* may transmit the COT access request without receiving a COT trigger message. The UE 115*i* may transmit the COT trigger message when the UE 115*i* does not have a substantial amount of data to transmit and may share the COT with other sidelink UEs. In some aspects, the UE 115*i* may transmit the COT trigger message via a PSSCH, a PSCCH, a PSFCH, SCI, a MAC CE message, a unicast message, a groupcast message, or other suitable communication. The UE 115*j* may transmit the COT trigger message in a first COT and receive the COT access request in the first COT or in a later COT. The COT trigger message may include a flag (e.g., a single bit 0 or 1) indicating a request for the COT access request. In some aspects, the COT trigger message may be transmitted as a groupcast message including a bitmap indicating the sidelink UEs (e.g., a subset of UEs of the groupcast) that are requested to provide a COT access request. In some aspects, the COT trigger message may include a zone identifier associated with the UE 115*i* indicating the zone IDs for the sidelink UEs that are requested to provide a COT access request. In some aspects, the COT trigger message may include a coordination window duration indicating a time frame (e.g., a maximum time frame) in which the second sidelink UE should respond to the COT trigger message. In some aspects, the COT trigger message may include a COT start time indicating when the COT will start.

At action 810, the UE 115*i* may perform a successful LBT. The UE 115*i* may perform a category 1 LBT, a category 2 LBT, a category 3 LBT, and/or a category 4 LBT to gain access to the COT in an unlicensed frequency spectrum.

At action 812, the UE 115*i* may transmit COT sharing information via sidelink control information (e.g., SCI-1, SCI-2), an RRC message, a PSCCH message, a PSSCH message, or other suitable communication to the UEs 115*j* and 115*k*. For example, the first sidelink UE may transmit the COT sharing information in a SL_COT_SharingInformation field via sidelink control information 2 (SCI-2). In some aspects, the COT sharing information may include information (e.g., parameters, resources, settings, commands, etc.) to enable the UE 115*i* to share the COT with the UEs 115*j* and 115*k*.

At action 814, the UE 115*j* may decode the COT sharing information received from the UE 115*i*. The COT sharing information may include a COT resource allocation that indicates resources the UE 115*j* may use to share the COT.

At action 816, the UE 115*k* may decode the COT sharing information received from the UE 115*i*. The COT sharing information may include a COT resource allocation that indicates resources the UE 115 may use to share the COT.

At action 820, the UE 115*j* may transmit a sidelink communication to the UE 115*k* in the resources allocated in the COT sharing information. The UE 115*j* may transmit the sidelink communication based on a priority (e.g., CAPC) associated with the UE 115*j*. For example, the UE 115*j* may have a lower CAPC value indicating higher priority than the UE 115*k*. Therefore the UE 115*j* may transmit before the UE 115*k*.

At action 822, the UE 115*k* may transmit a sidelink communication to the UE 115*i* in the resources allocated in the COT sharing information. The UE 115*k* may transmit the sidelink communication based on a priority (e.g., CAPC) associated with the UE 115*k*.

Figure 9:
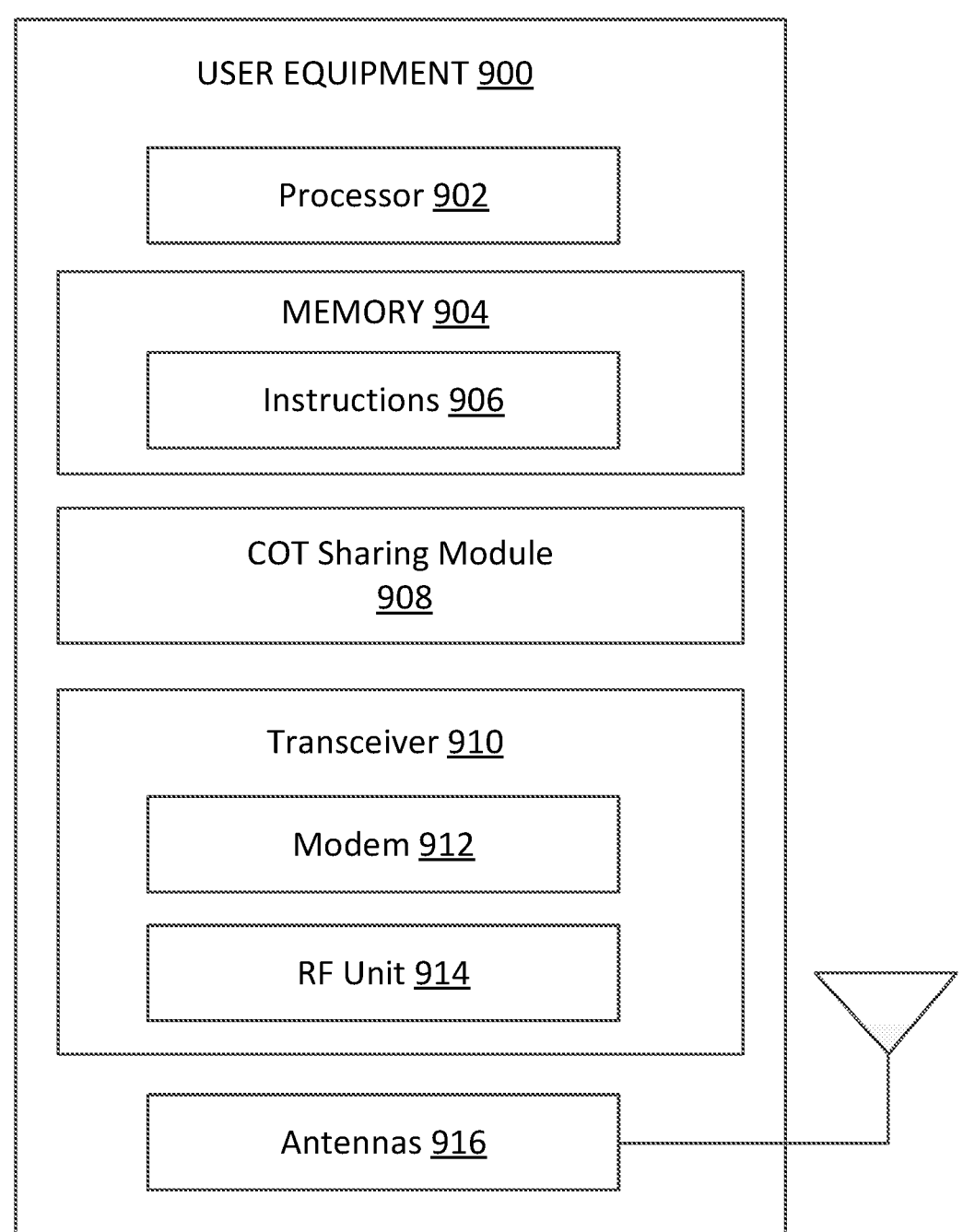
FIG. 9 is a block diagram of an exemplary user equipment (UE) according to some aspects of the present disclosure.

FIG. 9 is a block diagram of an exemplary UE 900 according to some aspects of the present disclosure. The UE 900 may be the UE 115 or the UE 120 in the network 100 or 200 as discussed above. As shown, the UE 900 may include a processor 902, a memory 904, a COT sharing module 908, a transceiver 910 including a modem subsystem 912 and a radio frequency (RF) unit 914, and one or more antennas 916. These elements may be coupled with each other and in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 904 includes a non-transitory computer-readable medium. The memory 904 may store instructions 906. The instructions 906 may include instructions that, when executed by the processor 902, cause the processor 902 to perform the operations described herein with reference to the UEs 115 in connection with aspects of the present disclosure, for example, aspects of FIGS. 3-8. Instructions 906 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The COT sharing module 908 may be implemented via hardware, software, or combinations thereof. For example, the COT sharing module 908 may be implemented as a processor, circuit, and/or instructions 906 stored in the memory 904 and executed by the processor 902. In some aspects, In some aspects, the COT sharing module 1008 may implement the aspects of FIGS. 3-8. For example, the COT sharing module 908 may performing a listen-before-talk (LBT) procedure. The COT sharing module 908 may acquiring, based on the LBT procedure being successful, a channel occupancy time (COT). The COT sharing module 908 may transmit, to a second sidelink UE during the COT, COT sharing information for sharing the COT with the second sidelink UE.

As shown, the transceiver 910 may include the modem subsystem 912 and the RF unit 914. The transceiver 910 can be configured to communicate bi-directionally with other devices, such as the BSs 105 and/or the UEs 115. The modem subsystem 912 may be configured to modulate and/or encode the data from the memory 904 and the according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data from the modem subsystem 912 (on outbound transmissions) or of transmissions originating from another source such as a UE 115 or a BS 105. The RF unit 914 may be further configured to perform analog beamforming in conjunction with the digital beamforming. Although shown as integrated together in transceiver 910, the modem subsystem 912 and the RF unit 914 may be separate devices that are coupled together to enable the UE 900 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The antennas 916 may include multiple antennas of similar or different designs in order to sustain multiple transmission links. The RF unit 914 may configure the antennas 916.

In some instances, the UE 900 can include multiple transceivers 910 implementing different RATs (e.g., NR and LTE). In some instances, the UE 900 can include a single transceiver 910 implementing multiple RATs (e.g., NR and LTE). In some instances, the transceiver 910 can include various components, where different combinations of components can implement RATs.

Figure 10:
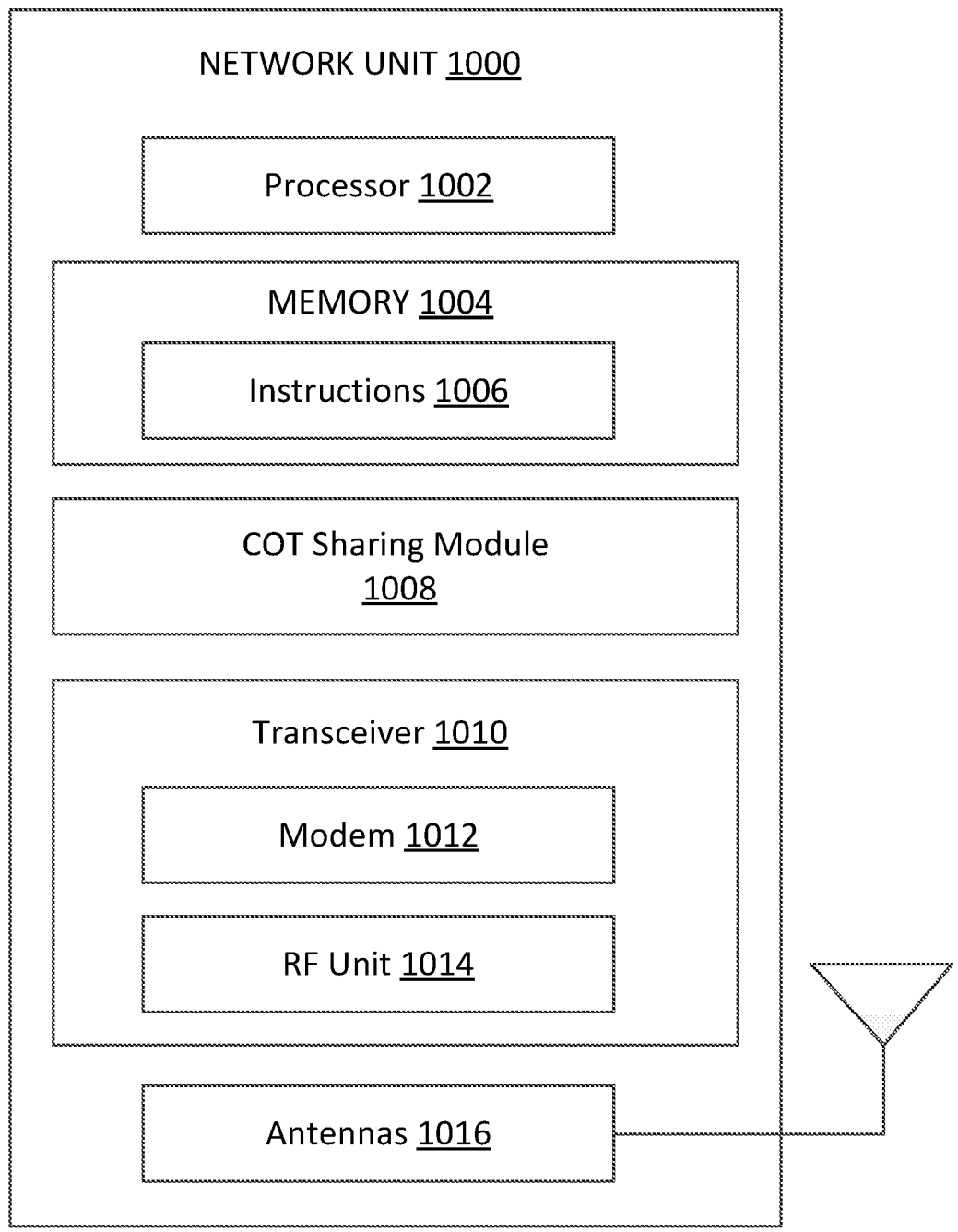
FIG. 10 is a block diagram of an exemplary network unit according to some aspects of the present disclosure.

FIG. 10 is a block diagram of an exemplary network unit 1000 according to some aspects of the present disclosure. The network unit 1000 may be a BS 105, the CU 210, the DU 230, or the RU 240, as discussed above. As shown, the network unit 1000 may include a processor 1002, a memory 1004, a COT sharing module 1008, a transceiver 1010 including a modem subsystem 1012 and a RF unit 1014, and one or more antennas 1016. These elements may be coupled with each other and in direct or indirect communication with each other, for example via one or more buses.

The processor 1002 may have various features as a specific-type processor. For example, these may include a CPU, a DSP, an ASIC, a controller, a FPGA device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 1004 may include a non-transitory computer-readable medium. The memory 1004 may store instructions 1006. The instructions 1006 may include instructions that, when executed by the processor 1002, cause the processor 1002 to perform operations described herein, for example, aspects of FIGS. 3-8. Instructions 1006 may also be referred to as code, which may be interpreted broadly to include any type of computer-readable statement(s).

The COT sharing module 1008 may be implemented via hardware, software, or combinations thereof. For example, the COT sharing module 1008 may be implemented as a processor, circuit, and/or instructions 1006 stored in the memory 1004 and executed by the processor 1002.

In some aspects, the COT sharing module 1008 may implement the aspects of FIGS. 3-8. For example, the COT sharing module 1008 may performing a listen-before-talk (LBT) procedure. The COT sharing module 1008 may acquiring, based on the LBT procedure being successful, a channel occupancy time (COT). The COT sharing module may transmit, to a second sidelink UE during the COT, COT sharing information for sharing the COT with the second sidelink UE.

Additionally or alternatively, the COT sharing module 1008 can be implemented in any combination of hardware and software, and may, in some implementations, involve, for example, processor 1002, memory 1004, instructions 1006, transceiver 1010, and/or modem 1012.

As shown, the transceiver 1010 may include the modem subsystem 1012 and the RF unit 1014. The transceiver 1010 can be configured to communicate bi-directionally with other devices, such as the UEs 115 and/or 600. The modem subsystem 1012 may be configured to modulate and/or encode data according to a MCS, e.g., a LDPC coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data from the modem subsystem 1012 (on outbound transmissions) or of transmissions originating from another source such as a UE 115 or UE 600. The RF unit 1014 may be further configured to perform analog beamforming in conjunction with the digital beamforming. Although shown as integrated together in transceiver 1010, the modem subsystem 1012 and/or the RF unit 1014 may be separate devices that are coupled together at the network unit 1000 to enable the network unit 1000 to communicate with other devices.

The RF unit 1014 may provide the modulated and/or processed data, e.g. data packets (or, more generally, data messages that may contain one or more data packets and other information), to the antennas 1016 for transmission to one or more other devices. This may include, for example, a configuration indicating a plurality of sub-slots within a slot according to aspects of the present disclosure. The antennas 1016 may further receive data messages transmitted from other devices and provide the received data messages for processing and/or demodulation at the transceiver 1010. The antennas 1016 may include multiple antennas of similar or different designs in order to sustain multiple transmission links.

In some instances, the network unit 1000 can include multiple transceivers 1010 implementing different RATs (e.g., NR and LTE). In some instances, the network unit 1000 can include a single transceiver 1010 implementing multiple RATs (e.g., NR and LTE). In some instances, the transceiver 1010 can include various components, where different combinations of components can implement RATs.

Figure 11:
FIG. 11 is a flow diagram of a communication method according to some aspects of the present disclosure.
Figure 11:
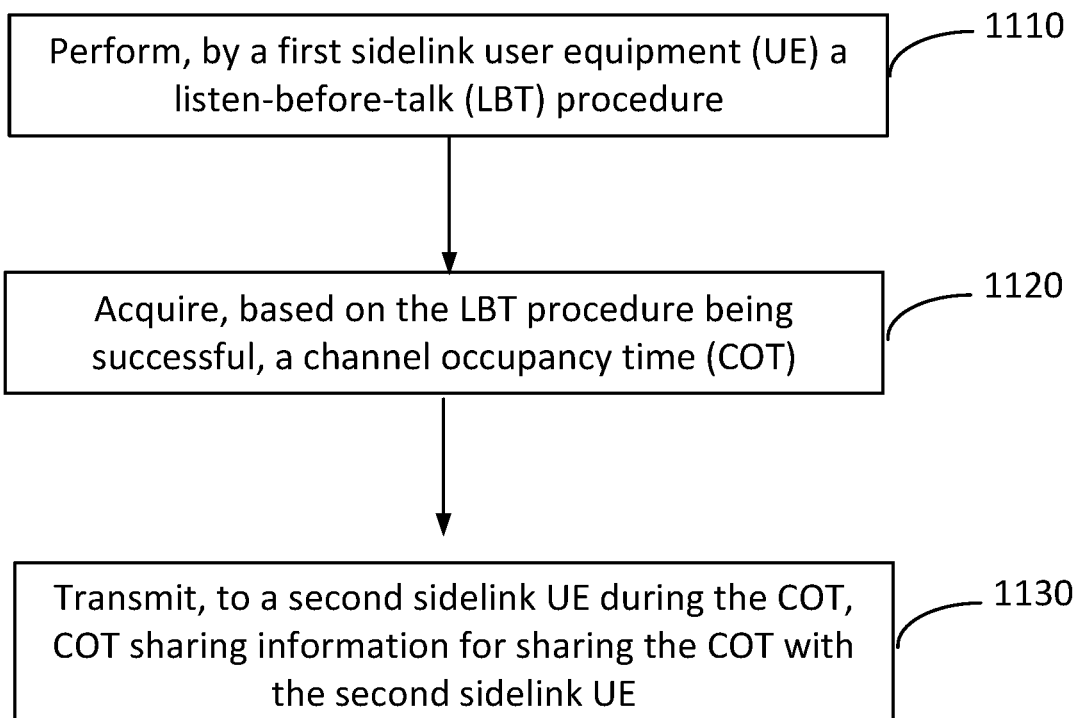

FIG. 11 is a flow diagram of a communication method 1100 according to some aspects of the present disclosure. Aspects of the method 1100 can be executed by a computing device (e.g., a processor, processing circuit, and/or other suitable component) of a wireless communication device or other suitable means for performing the aspects. For example, a wireless communication device, such as the UE 115, the UE 120, or the UE 900, may utilize one or more components, such as the processor 902, the memory 904, the COT sharing module 908, the transceiver 910, the modem 912, and the one or more antennas 916, to execute aspects of method 1100. The method 1100 may employ similar mechanisms as in the networks 100 and 200 and the aspects and actions described with respect to FIGS. 3-8. As illustrated, the method 1100 includes a number of enumerated aspects, but the method 1100 may include additional aspects before, after, and in between the enumerated aspects. In some aspects, one or more of the enumerated aspects may be omitted or performed in a different order.

At action 1110, the method 1100 includes a first sidelink UE (e.g., the UE 115, the UE 120, or the UE 900) performing a listen-before-talk (LBT) procedure. The first sidelink UE may perform the LBT procedure or other clear channel assessment (CCA) on one or more sidelink communication channels. In some instances, the first sidelink UE may perform an LBT procedure or other CCA to gain access to a channel occupancy time (COT) in an unlicensed (e.g., shared) frequency spectrum. For example, the first sidelink UE may perform a category 1 LBT, a category 2 LBT, a category 3 LBT, and/or a category 4 LBT to gain access to the COT in an unlicensed frequency spectrum. In some aspects, the first sidelink UE may perform the LBT in one or more time resources, spatial resources, and/or frequency resources. The frequency resources may include a frequency spectrum, a frequency band, a frequency sub-band, a frequency subchannel, resource elements, resource blocks, and/or a frequency interlace. The time resources may include slot(s), sub-slot(s), symbol(s), subframe(s), or any other suitable time resources. In some aspects, the first sidelink UE may perform the LBT for one or more directional beams (e.g., a beam in the direction of the UE that the first sidelink UE intends to transmit a communication to and/or receive a communication from).

At action 1120, the method 1100 includes the first sidelink UE acquiring a channel occupancy time (COT) based on the LBT procedure at action 1110 being successful. The first sidelink UE may acquire the COT to transmit a communication to another sidelink UE. Additionally or alternatively, the first sidelink UE may share the COT with other sidelink UEs.

At action 1130, the method 1100 includes the first sidelink UE transmitting COT sharing information to a second sidelink UE (e.g., the UE 115, the UE 120, or the UE 900) for sharing the COT with the second sidelink UE. The first sidelink UE may transmit the COT sharing information to the second sidelink UE during the COT. The COT sharing information may include a COT resource allocation that indicates resources the second sidelink UE may use to share the COT. In some aspects, the first sidelink UE may transmit the COT sharing information to the second sidelink UE and other sidelink UEs (e.g., a group of sidelink UEs, a set of sidelink UEs). The first sidelink UE may transmit the COT sharing information including resource allocations to the set of sidelink UEs to share the COT with the set of sidelink UEs.

In some aspects, the first sidelink UE may transmit the COT sharing information via sidelink control information (e.g., SCI-1, SCI-2), an RRC message, a PSCCH message, a PSSCH message, or other suitable communication. For example, the first sidelink UE may transmit the COT sharing information in a SL_COT_SharingInformation field via sidelink control information 2 (SCI-2).

In some aspects, the COT sharing information may include information (e.g., parameters, resources, settings, commands, etc.) to enable the first sidelink UE to share the COT with other sidelink UEs (e.g., the second sidelink UE). Sharing the COT with other sidelink UEs may enable the other sidelink UEs to transmit and/or receive communications during the COT in an efficient and coordinated fashion. In some aspects, the COT sharing information may include identifiers associated with the set of sidelink UEs that share the COT. The sidelink UE identifiers may include layer one identifiers unique to each sidelink UE that shares the COT.

In some aspects, the COT sharing information may include a time resource allocation associated with the COT sharing. For example, the time resource allocation may include a COT start time, a COT end time, and/or a COT duration. The time resource allocation may include time resources (e.g., slots, sub-slots, symbols, frames, etc.) allocated to the set of sidelink UEs that share the COT. For example, the time resource allocation may indicate index(s) indicating starting slot(s) and/or sub-slot(s) allocated to the set of sidelink UEs. The time resource allocation may indicate a number of time resources (e.g., a number of slots, sub-slots, and/or symbols) allocated to the set of sidelink UEs. The first sidelink UE may indicate the time resource allocation(s) to the sidelink UEs sharing the COT in a time domain resource allocation (TDRA) via SCI-1.

In some aspects, the time resource allocation included in the COT sharing information may indicate time resources associated with sharing the COT relative to when the LBT procedure is successful. For example, if the first sidelink UE performs a successful LBT at slot i, then the time resource allocation may indicate the resources associated with COT sharing relative to slot i. In some instances, the time resource allocation may indicate the resources associated with COT sharing as a number (e.g., an integer number) of slots, a number of sub-slots, or a number of symbols from slot i (e.g., the end of slot i and/or the beginning of slot i). In some aspects, the time resource allocation may indicate the resources associated with COT sharing as a time value (e.g., number of milliseconds) relative to slot i.

In some aspects, the COT sharing information may indicate a COT duration. The COT duration may indicate a time period for sidelink UEs to share the COT during which the first sidelink UE and the COT sharing UE(s) may communicate. The COT duration may start from a successful LBT by the first sidelink UE. In some aspects, the COT duration may be based on an amount of data (e.g., transport blocks) the first sidelink UE and/or the COT sharing UE(s) need to transmit. A larger amount of data may require a longer COT duration as compared to a smaller amount of data. The COT duration may be indicated to the COT sharing UE(s) as a number of slots, a number of sub-slots, a number of symbols, a number of milliseconds, or a combination thereof. In some aspects, the COT duration may be indicated as a remaining COT duration. For example, the COT duration may be a duration of x slots. The first sidelink UE may use y slots of the x slots to transmit sidelink communications. The remaining COT duration may be indicated to the second sidelink UE and/or other COT sharing sidelink UEs as x-y slots.

In some aspects, the COT sharing information may include a frequency resource allocation (e.g., frequency range(s)) associated with the COT sharing. For example, the frequency resource allocation may include a starting frequency (e.g., a starting frequency subchannel index, a starting frequency band, a starting frequency interlace). The frequency resource allocations may include an ending frequency (e.g., an ending subchannel, an ending frequency band). The frequency resource allocations may include a frequency interlace (e.g., a frequency interlace index, indexes of subchannels). The frequency resource allocation may indicate frequency resources allocated to the set of sidelink UEs that share the COT with the first sidelink UE. The first sidelink UE may indicate the frequency resource allocation(s) to the sidelink UEs sharing the COT in a frequency domain resource allocation (FDRA) via SCI-1.

In some aspects, the first sidelink UE may transmit a flag indicating the first sidelink UE is sharing the COT. In this regard, the first sidelink UE may transmit the flag via SCI (e.g., SCI-1, SCI-2) indicating the first sidelink UE is sharing the COT. The flag may include a single bit (e.g., 0 or 1) indicator, a multi-bit indicator, a code point, or other indicator to indicate the other sidelink UEs (e.g., the sidelink UEs receiving the flag) may share the COT.

In some aspects, the first sidelink UE may transmit the flag in SCI-2 via a PSSCH. The SCI-2 may include destination identifier(s) associated with the second sidelink UE and other sidelink UEs indicating the first sidelink UE shares the COT with the second sidelink UE and the other sidelink UEs. The sidelink UEs in proximity to the first sidelink UE that receive and decode the SCI-2 may share the COT with the first sidelink UE if the SCI-2 includes an identifier that matches the identifier associated with the receiving sidelink UE.

In some aspects, the first sidelink UE may transmit the COT sharing information to a third sidelink UE for sharing the COT with the third sidelink UE. The COT sharing information may indicate frequency resources allocated to the second sidelink UE frequency division multiplexed with frequency resources allocated to the third sidelink UE. In some aspects, the COT sharing information may indicate the same cyclic prefix extension (CPE) length allocated to the second sidelink UE and the third sidelink UE. By having the same CPE length, the second and third sidelink UEs may each transmit a sidelink communication at the same but the sidelink transmissions may not interfere with one another due to the second and third sidelink UEs transmitting in different frequency ranges. In some aspects, the second and third sidelink UEs may perform an LBT (e.g., CAT 1 LBT, CAT 2 LBT) based on the time gap between the end of the first sidelink UE's transmission and the CPE length indicated by the COT sharing information.

Additionally or alternatively, the COT sharing information may indicate time resources allocated to the second sidelink UE time division multiplexed with time resources allocated to the third sidelink UE. For example, the first sidelink UE may transmit in slot 1, the second sidelink UE may transmit in slot 2, and the third sidelink UE may transmit in slot 3. Slots 1, 2, and 3 may be contiguous or non-contiguous. The first, second, and third sidelink UEs may transmit in the same frequency range(s) or different frequency range(s). In some aspects, the COT sharing information may indicate the same CPE length allocated to the second sidelink UE and the third sidelink UE. In some aspects, the COT sharing information may indicate different CPE lengths allocated to the second sidelink UE and the third sidelink UE. The second and third sidelink UEs may each transmit a sidelink communication in their respective time allocations and not interfere with one another due to transmitting at different times. In some aspects, the second sidelink UE may perform an LBT (e.g., CAT 1 LBT, CAT 2 LBT) based on the time gap between the end of the first sidelink UE's transmission and the CPE length indicated for the second sidelink UE. In some aspects, the third sidelink UE may perform an LBT (e.g., CAT 1 LBT, CAT 2 LBT) based on the time gap between the end of the second sidelink UE's transmission and the CPE indicated for the third sidelink UE.

Additionally or alternatively, the COT sharing information may indicate the same time and frequency resources allocated to the second sidelink UE and the third sidelink UE. The time and/or frequency resources allocated to the second and third sidelink UEs may completely overlap or may partially overlap. In some aspects, the COT sharing information may schedule the second and third sidelink UEs to transmit on the same slot boundary. The second and third sidelink UEs may be allocated different CPE lengths. For example, the second sidelink UE may be allocated a longer CPE length than the third sidelink UE. Since the longer CPE length allows the second sidelink UE to transmit earlier in time, the second sidelink UEs transmission may block the third sidelink UEs transmission. The CPE length may be allocated based on a priority (e.g., CAPC) associated the sidelink UEs transmission. For example, the second and third sidelink UEs may indicate to the first sidelink UE a priority associated with their respective scheduled transmissions. The first sidelink UE may assign the CPE length based on the relative priorities. By assigning overlapping time and frequency resources to the second and third sidelink UEs, the probability of retaining the COT is increased. For example, if the second sidelink UE having the longer CPE length does not transmit in the allocated time slot, the third sidelink UE with the shorter CPE length may transmit in the COT. By maintaining a transmission in the COT, the probability of another device (e.g., WiFi™ device, a non-COT sharing UE) gaining the COT is reduced. Although the above example discusses two sidelink UEs allocated overlapping resources, the present disclosure is not so limited and any number of sidelink UEs may be allocated overlapping resources.

In some aspects, the COT sharing information may indicate a groupcast identifier associated with a set of sidelink UEs for sharing the COT with the first sidelink UE. In this regard, the first sidelink UE may transmit the COT sharing information via SCI-2. The SCI-2 may include a groupcast identifier that indicates the set of sidelink UEs including the second sidelink UE that may share the COT.

In some aspects, the first sidelink UE may transmit an indicator to the second sidelink UE and/or other COT sharing sidelink UEs indicating whether the COT sharing information includes legacy resource reservations. In this regard, the first sidelink UE may transmit the indicator via a radio resource control (RRC) message. The indicator may indicate whether the TDRA field and/or the FDRA field carries the COT sharing information or the legacy time/ frequency resource reservations.

FIG. 12 is a flow diagram of a communication method 1200 according to some aspects of the present disclosure. Aspects of the method 1200 can be executed by a computing device (e.g., a processor, processing circuit, and/or other suitable component) of a wireless communication device or other suitable means for performing the aspects. For example, a wireless communication device, such as the UE 115, the UE 120, or the UE 900, may utilize one or more components, such as the processor 902, the memory 904, the COT sharing module 908, the transceiver 910, the modem 912, and the one or more antennas 916, to execute aspects of method 1200. The method 1200 may employ similar mechanisms as in the networks 100 and 200 and the aspects and actions described with respect to FIGS. 3-8. As illustrated, the method 1200 includes a number of enumerated aspects, but the method 1200 may include additional aspects before, after, and in between the enumerated aspects. In some aspects, one or more of the enumerated aspects may be omitted or performed in a different order.

At action 1210, the method 1200 includes a first sidelink UE (e.g., the UE 115, the UE 120, or the UE 900) receiving COT sharing information from a second sidelink UE (e.g., the UE 115, the UE 120, or the UE 900) for sharing a COT with the second sidelink UE. The first sidelink UE (e.g., the COT sharing UE) may receive the COT sharing information from the second sidelink UE (e.g., the COT initiating UE) during the COT. The COT sharing information may include a COT resource allocation that indicates resources the first sidelink UE may use to share the COT. In some aspects, the first sidelink UE and other sidelink UEs (e.g., a group of sidelink UEs, a set of sidelink UEs) may receive the COT sharing information from the second sidelink UE.

In some aspects, the first sidelink UE may receive the COT sharing information via sidelink control information (e.g., SCI-1, SCI-2), an RRC message, a PSCCH message, a PSSCH message, or other suitable communication. For example, the first sidelink UE may receive the COT sharing information in a SL_COT_SharingInformation field via SCI-2. In some aspects, the COT sharing information may include an identifier associated with the second sidelink UE, At action 1220, the method 1200 includes the first sidelink UE (a COT sharing UE) monitoring for SCI from a third sidelink UE (e.g., a COT sharing UE) that includes the identifier associated with the second sidelink UE (e.g., the COT initiating UE). The first sidelink UE may receive the COT sharing information from the second sidelink UE during a first slot (slot 1). The COT sharing information may allocate resources (e.g., schedule resources) for the third sidelink UE to transmit in a second slot (slot 2) and the first sidelink UE to transmit in a third slot (slot 3). The first sidelink UE may monitor for SCI during slot 2 to determine whether the third sidelink UE transmitted during slot 2 (e.g., the slot prior to slot 3 allocated to the first sidelink UE). If the third sidelink UE did not transmit during slot 2, the COT may be lost due to another device gaining the COT. In some aspects, the third sidelink UE may transmit SCI in slot 2 that includes an identifier associated with the second sidelink UE (e.g., the COT initiator). If the first sidelink UE detects that the SCI transmitted in the second slot includes the identifier associated with the second sidelink UE then the first sidelink UE knows that the third sidelink UE transmitted in slot 2. If the first sidelink UE does not detect an SCI or detects that the SCI transmitted in the second slot does not include the identifier associated with the second sidelink UE then the first sidelink UE knows that the third sidelink UE did not transmit in slot 2 or a UE other than the scheduled third sidelink UE transmitted in slot 2. If the first sidelink UE detects the SCI including the identifier of the second sidelink UE (e.g., the COT initiator) then the COT is retained and the second sidelink UE may transmit in slot 3. If the first sidelink UE does not detect the SCI including the identifier of the second sidelink UE (e.g., the COT initiator) then the COT is lost and the second sidelink UE may refrain from transmitting in slot 3. In some aspects, if the COT is lost the first sidelink UE may contend for another COT by performing an LBT in order to transmit.

FIG. 13 is a flow diagram of a communication method 1300 according to some aspects of the present disclosure. Aspects of the method 1300 can be executed by a computing device (e.g., a processor, processing circuit, and/or other suitable component) of a wireless communication device or other suitable means for performing the aspects. For example, a wireless communication device, such as the UE 115, the UE 120, or the UE 900, may utilize one or more components, such as the processor 902, the memory 904, the COT sharing module 908, the transceiver 910, the modem 912, and the one or more antennas 916, to execute aspects of method 1300. The method 1300 may employ similar mechanisms as in the networks 100 and 200 and the aspects and actions described with respect to FIGS. 3-8. As illustrated, the method 1300 includes a number of enumerated aspects, but the method 1300 may include additional aspects before, after, and in between the enumerated aspects. In some aspects, one or more of the enumerated aspects may be omitted or performed in a different order.

At action 1310, the method 1300 includes a first sidelink UE (e.g., the UE 115, the UE 120, or the UE 900) performing an LBT (e.g., CAT 2 LBT, CAT 3 LBT, CAT 4 LBT) procedure to contend for a COT.

At action 1320, the method 1300 includes the first sidelink UE acquiring the COT based on the LBT procedure at action 1310 being successful.

At action 1330, the method 1300 includes the first sidelink UE transmitting COT sharing information to a second sidelink UE for sharing the COT with the second sidelink UE.

In some aspects, the category of the LBT procedure and/or the COT sharing information may be based on a channel access priority class (CAPC) associated with at least one of the first sidelink UE or the second sidelink UE (e.g., a CAPC associated with data to be transmitted by the first sidelink UE and/or the second sidelink UE). In some aspects, the CAPC may be based on a 5G quality of service identifier (5QI) associated with the first sidelink UE and/or the second sidelink UE. The 5QI may indicate the quality of service characteristics and/or priority level associated with the data to be transmitted by the first sidelink UE and/or the second sidelink UE. The 5QI may be indicated as an index to a lookup table that maps the 5QI to the CAPC.

Additionally or alternatively, the CAPC may be based on a PC5 quality indicator (PQI) associated with the first sidelink UE and/or the second sidelink UE. The PQI may indicate the quality of service characteristics and/or priority level associated with the data to be transmitted by the first sidelink UE and/or the second sidelink UE. The PQI may indicate QOS characteristics specific to sidelink communications. The PQI may be indicated as an index to a lookup table that maps the PQI to the CAPC.

In some aspects, the first sidelink UE may determine the CAPC based on the highest access priority of the QoS flows on a radio bearer. In some aspects, the CAPC may be based on QCI weighted buffer lengths. The first sidelink UE may have different types of data (e.g., voice data, control data, media content data, etc.) in a buffer to be transmitted. Each of the different types of data may have an associated priority based on latency budgets, the amount of data, and/or other parameters associated with the data. In some aspects, the CAPC may be proportional to QCI weighted buffer lengths according to Equation (1).

$$CAPC \alpha W_1 B_1 + W_2 B_2 + W_3 B_3 + W_4 B_4 + \tag{1},$$

where $W_p$ is a pre-configured weight and $B_p$ is the buffer size of PQIs of priority $_p$.

In some aspects, the first sidelink UE (e.g., the COT initiator) may schedule transmissions for the second sidelink UE and/or other sidelink UEs that share the COT based on the respective CAPC(s) associated with the COT sharing sidelink UEs. Each of the COT sharing UEs may transmit its respective CAPC associated with buffered data (e.g., the CAPC associated with future transmissions) to the first sidelink via SCI. The first sidelink UE may determine the schedule for the first sidelink UE and the COT sharing sidelink UEs based on an aggregation of the respective CAPCs (e.g., respective CAPCs based on Equation (1)). For example, if the second sidelink UE has higher priority data than the first sidelink UE, the first sidelink UE may schedule the second sidelink UE to transmit before the first sidelink UE.

FIG. 14 is a flow diagram of a communication method 1400 according to some aspects of the present disclosure. Aspects of the method 1400 can be executed by a computing device (e.g., a processor, processing circuit, and/or other suitable component) of a wireless communication device or other suitable means for performing the aspects. For example, a wireless communication device, such as the UE 115, the UE 120, or the UE 900, may utilize one or more components, such as the processor 902, the memory 904, the COT sharing module 908, the transceiver 910, the modem 912, and the one or more antennas 916, to execute aspects of method 1400. The method 1400 may employ similar mechanisms as in the networks 100 and 200 and the aspects and actions described with respect to FIGS. 3-8. As illustrated, the method 1400 includes a number of enumerated aspects, but the method 1400 may include additional aspects before, after, and in between the enumerated aspects. In some aspects, one or more of the enumerated aspects may be omitted or performed in a different order.

At action 1410, the method 1400 includes a first sidelink UE (e.g., the UE 115, the UE 120, or the UE 900) receiving respective first sidelink control information (SCI) from one or more sidelink UEs. In this regard, the first sidelink UE (e.g., the COT initiator) may monitor for and decode SCIs from neighboring sidelink UEs (e.g., sidelink UEs in proximity to the first sidelink UE).

At action 1420, the method 1400 includes the first sidelink UE storing identifiers associated with each of the neighboring sidelink UEs in a memory (e.g., the memory 904). The stored UE identifiers may serve as a neighbor list that includes sidelink UEs in proximity to the first sidelink UE. The first sidelink UE may measure a signal strength (e.g., RSRP, RSSI) associated with the SCI(s). When the measured signal strength of the received SCI satisfies a threshold, the first sidelink UE may store the sidelink UE identifier (e.g., source ID) associated with the SCI.

At action 1430, the method 1400 includes a first sidelink UE performing an LBT (e.g., CAT 2 LBT, CAT 3 LBT, CAT 4 LBT) procedure to contend for a COT.

At action 1440, the method 1400 includes the first sidelink UE acquiring the COT based on the LBT procedure at action 1430 being successful.

At action 1450, the method 1400 includes the first sidelink UE transmitting COT sharing information for sharing the COT to the one or more sidelink UEs. In some aspects, the first sidelink UE may determine which sidelink UEs to share the COT with based on the neighbor list. The COT sharing information may include a time division multiplexing schedule for sharing the COT. In this regard, each of the COT sharing sidelink UEs may receive a time allocation for transmitting in the COT. The time allocation (e.g., a number of slots, a number of sub slots, a number of symbols) may be the same or different for each of the COT sharing UEs. A COT sharing UE may transmit during its respective allocated time. If a COT sharing UE does not have data to transmit in its respective allocated time, the COT sharing UE may transmit random data to retain the COT.

In some aspects, the first sidelink UE (e.g., the COT initiator) may store in a memory (e.g., the memory 904) timestamps associated with the SCIs received from the COT sharing UEs. The timestamps may indicate the last time the COT sharing UEs transmitted an SCI. In order to provide access (e.g., fair access) to the COT, the first sidelink UE may schedule the COT sharing UEs based on an ordering of the timestamps. For example, the first sidelink UE may schedule the COT sharing UE with the oldest timestamp to transmit before the COT sharing UE with the next oldest timestamp, etc. In this manner, the COT sharing UEs may share the COT based on an order of the timestamps from the oldest timestamp to the newest timestamp.

In some aspects, each of the scheduled COT sharing UEs may transmit in its respective time allocation during the COT without performing an LBT before transmitting. In this regard, the scheduled COT sharing UE may skip the LBT before transmitting if the time duration from the previous transmission (e.g., transmission from the previously scheduled UE) ending to the start of the scheduled transmission satisfies a threshold (e.g., less than 25 microseconds, less than 16 microseconds, less than 9 microseconds, or less than another time duration).

In some aspects, the first sidelink UE may monitor for additional SCIs from the COT sharing UEs in the neighbor list. If the first sidelink UE does not receive an additional SCI from a sidelink UE in the neighbor list for a period of time (e.g., a period of time exceeding a threshold), the sidelink UE may be removed from the neighbor list and may not be scheduled for additional (e.g., future) time slots to share the COT.

FIG. 15 is a flow diagram of a communication method 1500 according to some aspects of the present disclosure. Aspects of the method 1500 can be executed by a computing device (e.g., a processor, processing circuit, and/or other suitable component) of a wireless communication device or other suitable means for performing the aspects. For example, a wireless communication device, such as the UE 115, the UE 120, or the UE 900, may utilize one or more components, such as the processor 902, the memory 904, the COT sharing module 908, the transceiver 910, the modem 912, and the one or more antennas 916, to execute aspects of method 1500. The method 1500 may employ similar mechanisms as in the networks 100 and 200 and the aspects and actions described with respect to FIGS. 3-8. As illustrated, the method 1500 includes a number of enumerated aspects, but the method 1500 may include additional aspects before, after, and in between the enumerated aspects. In some aspects, one or more of the enumerated aspects may be omitted or performed in a different order.

At action 1510, the method 1500 includes a first sidelink UE (e.g., the UE 115, the UE 120, or the UE 900) receiving SCI (e.g., SCI-1 or SCI-2) from a second sidelink UE. The SCI may indicate a CAPC associated with a communication to be transmitted (e.g., a CAPC associated with a future transmission) by the second sidelink UE. In some aspects, the SCI (e.g., SCI-1 or SCI-2) may further indicate a periodicity associated with the communication to be transmitted by the second sidelink UE. In some aspects, the SCI (e.g., SCI-1 or SCI-2) may further indicate a buffer status report (BSR) associated with the communication to be transmitted by the second sidelink UE. In this regard, the first sidelink UE may receive the BSR in a MAC-CE message via SCI-2 and/or a MAC-CE broadcast message. The second sidelink UE may transmit the BSR to the first sidelink UE based on an amount of data in the transmit buffer satisfying a threshold. For example, when the transmit buffer of the second sidelink UE exceeds a threshold, the second sidelink UE may transmit the BSR to the first sidelink UE to indicate that the second sidelink UE requests COT sharing in order to transmit the data in the buffer.

At action 1520, the method 1500 includes the first sidelink UE performing an LBT (e.g., CAT 2 LBT, CAT 3 LBT, CAT 4 LBT) procedure to contend for a COT.

At action 1530, the method 1500 includes the first sidelink UE acquiring the COT based on the LBT procedure at action 1520 being successful.

At action 1540, the method 1500 includes the first sidelink UE transmitting COT sharing information for sharing the COT with the second sidelink UE. In some aspects, the first sidelink UE may share the COT with the second sidelink UE and/or other sidelink UEs indicating CAPCs satisfying a threshold. For example, the first sidelink UE may share the COT with sidelink UEs indicating CAPCs having a value of 1 or 2. The first sidelink UE may not share the COT with sidelink UEs indicating CAPCs having a value of 3 or 4. A lower CAPC value may indicate a higher priority associated with the data (e.g., buffered data) to be transmitted by the sidelink UE.

In some aspects, the first sidelink UE may transmit the COT sharing information and share the COT with the second sidelink UE based on the periodicity associated with the communication to be transmitted by the second sidelink UE. For example, if the second sidelink UE indicates it has data to be transmitted on a periodic basis, the first sidelink UE may schedule the second sidelink UE to transmit in the COT based on the periodicity. However, the first sidelink UE may not schedule the periodic transmission for the second sidelink UE if another COT sharing UE has higher priority data (e.g., a lower CAPC value) to transmit.

In some aspects, the first sidelink UE may transmit the COT sharing information and share the COT with the second sidelink UE based on the BSR. For example, when the second sidelink UE transmits a BSR indicating that its transmit buffer is above a threshold, the first sidelink UE may schedule the second sidelink UE to transmit in the COT based on the BSR. However, the first sidelink UE may not schedule the transmission for the second sidelink UE if another COT sharing UE has higher priority data (e.g., a lower CAPC value) to transmit than the CAPC associated with the second sidelink UE's buffered data.

FIG. 16 is a flow diagram of a communication method 1600 according to some aspects of the present disclosure. Aspects of the method 1600 can be executed by a computing device (e.g., a processor, processing circuit, and/or other suitable component) of a wireless communication device or other suitable means for performing the aspects. For example, a wireless communication device, such as the UE 115, the UE 120, or the UE 900, may utilize one or more components, such as the processor 902, the memory 904, the COT sharing module 908, the transceiver 910, the modem 912, and the one or more antennas 916, to execute aspects of method 1600. The method 1600 may employ similar mechanisms as in the networks 100 and 200 and the aspects and actions described with respect to FIGS. 3-8. As illustrated, the method 1600 includes a number of enumerated aspects, but the method 1600 may include additional aspects before, after, and in between the enumerated aspects. In some aspects, one or more of the enumerated aspects may be omitted or performed in a different order.

At action 1610, the method 1600 includes a first sidelink UE (e.g., the UE 115, the UE 120, or the UE 900) receiving a channel occupancy time (COT) access request from a second sidelink UE. In some aspects, the first sidelink UE may receive the COT access request from the second sidelink UE when the second sidelink UE requests access to the channel by sharing a COT with the first sidelink UE. In some aspects, the first sidelink UE may receive a COT access request from multiple sidelink UEs requesting access to the channel by sharing the COT. In some aspects, the first sidelink UE may use the COT access request(s) to coordinate scheduling of multiple COTs. The second sidelink UE may transmit the COT access request to multiple sidelink UEs (e.g., sidelink UEs listed in a neighbor list). Any sidelink UE receiving the COT access request may act as the first sidelink UE to coordinate the COT sharing.

The second sidelink UE may transmit the COT access request based on a buffer status associated with the second sidelink UE. For example, when a transmit buffer of the second sidelink UE satisfies a threshold (e.g., exceeds a threshold) the second sidelink UE may transmit the COT access request to share a COT with the first sidelink UE or other sidelink UEs in order to transmit the data in the buffer. The second sidelink UE may transmit the COT access request during a current COT requesting access in a later COT. The COT access request may include time/frequency resources for the second sidelink UE to share the COT. The requested time/frequency resources may be based on a priority (e.g., CAPC) associated with the buffered data and/or an amount of buffered data to be transmitted. The COT access request may include a CAPC associated with the buffered data. The COT access request may include an expiration time indicating when the COT access request expires. In this regard, when the second sidelink UE has a large amount of buffered data to transmit, the COT access request may indicate no expiration.

In some aspects, the second sidelink UE may transmit the COT access request via a PSSCH, a PSCCH, a PSFCH, SCI, a MAC CE message, a unicast message, a groupcast message, or other suitable communication. In some aspects, the second sidelink UE may broadcast the COT access request to request COT sharing from any neighboring sidelink UE that receives the broadcasted request. In some aspects, the second sidelink UE may transmit the COT access request via a flag (e.g., a single bit 0 or 1) or via a multibit indicator. For example, a legacy PSFCH may carry a single bit indicator indicating the COT access request. The first sidelink UE may interpret the single bit PSFCH as a COT access request when there is no mapping of the PSFCH to a PSSCH.

In some aspects, the first sidelink UE may transmit a COT trigger message to the second sidelink UE. The second sidelink UE may transmit the COT access request in response to the COT trigger message. In some aspects, the second sidelink UE may transmit the COT access request without receiving a COT trigger message. The first sidelink UE may transmit the COT trigger message when the first sidelink UE does not have a substantial amount of data to transmit and may share the COT with other sidelink UEs. In some aspects, the first sidelink UE may transmit the COT trigger message via a PSSCH, a PSCCH, a PSFCH, SCI, a MAC CE message, a unicast message, a groupcast message, or other suitable communication. The first sidelink UE may transmit the COT trigger message in a first COT and receive the COT access request in the first COT or in a later COT. The COT trigger message may include a flag (e.g., a single bit 0 or 1) indicating a request for the COT access request. In some aspects, the COT trigger message may be transmitted as a groupcast message including a bitmap indicating the sidelink UEs (e.g., a subset of UEs of the groupcast) that are requested to provide a COT access request. In some aspects, the COT trigger message may include a zone identifier associated with the first sidelink UE indicating the zone IDs for the sidelink UEs that are requested to provide a COT access request. In some aspects, the COT trigger message may include a coordination window duration indicating a time frame (e.g., a maximum time frame) in which the second sidelink UE should respond to the COT trigger message. In some aspects, the COT trigger message may include a COT start time indicating when the COT will start.

At action 1620, the method 1600 includes the first sidelink UE performing an LBT (e.g., CAT 2 LBT, CAT 3 LBT, CAT 4 LBT) procedure to contend for a COT.

At action 1630, the method 1600 includes the first sidelink UE acquiring the COT based on the LBT procedure at action 1620 being successful.

At action 1640, the method 1600 includes the first sidelink UE transmitting COT sharing information to the second sidelink UE for sharing the COT with the second sidelink UE. The COT sharing information may be based on (e.g., in response to) the COT access request. In some aspects, the COT sharing information may include the time/frequency resources requested by the second sidelink UE at action 1610.

Further aspects of the present disclosure include the following:

Aspect 1 includes a method of wireless communication performed by a first sidelink user equipment (UE), the method comprising performing a listen-before-talk (LBT) procedure; acquiring, based on the LBT procedure being successful, a channel occupancy time (COT); and transmitting, to a second sidelink UE during the COT, COT sharing information for sharing the COT with the second sidelink UE.

Aspect 2 includes the method of aspect 1 further comprising: transmitting, to a set of sidelink UEs during the COT, the COT resource allocation for sharing the COT with the set of sidelink UEs, wherein the set of sidelink UEs includes the second sidelink UE.

Aspect 3 includes the method of any of aspects 1-2, further comprising: transmitting, based on the LBT being successful, a sidelink communication during the COT to one or more sidelink UEs different than the second sidelink UE.

Aspect 4 includes the method of any of aspects 1-3, wherein the LBT procedure comprises at least one of a category 2 LBT or a category 4 LBT.

Aspect 5 includes the method of any of aspects 1-4, wherein the transmitting the COT sharing information comprises transmitting the COT sharing information via sidelink control information 2 (SCI-2).

Aspect 6 includes the method of any of aspects 1-5, wherein the transmitting the first communication comprises transmitting the first communication based on a priority associated with the first communication.

Aspect 7 includes the method of any of aspects 1-6, further comprising transmitting a flag via sidelink control information indicating the first sidelink UE is sharing the COT.

Aspect 8 includes the method of any of aspects 1-7, further comprising transmitting sidelink control information 2 (SCI-2) via the PSSCH, wherein the SCI-2 comprises a destination identifier associated with the second sidelink UE indicating the first sidelink UE shares the COT with the second sidelink UE.

Aspect 9 includes the method of any of aspects 1-8, wherein the COT sharing information comprises at least one of: identifiers associated with a set of sidelink UEs that share the COT, wherein the identifiers include an identifier associated with the second sidelink UE; a time resource allocation associated with the COT sharing; a frequency resource allocation associated with the COT sharing; a COT start time; a COT end time; a starting frequency; and end frequency; one or more frequency interlaces; or a cyclic prefix extension (CPE) length associated with the COT sharing.

Aspect 10 includes the method of any of aspects 1-9, wherein the COT sharing information includes the time resource allocation and the time resource allocation includes at least one of: a slot index indicating a starting slot allocated to the second sidelink UE to share the COT; a number of slots allocated to the second sidelink UE to share the COT; a subslot index indicating a starting subslot allocated to the second sidelink UE to share the COT; or a number of sub slots allocated to the second sidelink UE to share the COT.

Aspect 11 includes the method of any of aspects 1-10, wherein the COT sharing information includes the frequency resource allocation and the frequency resource allocation includes at least one of: a starting frequency subchannel index indicating a starting frequency subchannel allocated to the second sidelink UE to share the COT; a starting frequency interlace index indicating a starting frequency interlace allocated to the second sidelink UE to share the COT; a starting resource block index indicating a starting resource block allocated to the second UE to share the COT;

a number of frequency subchannels allocated to the second sidelink UE to share the COT; a number of frequency interlaces allocated to the second sidelink UE to share the COT; or a number of resource blocks allocated to the second sidelink UE to share the COT.

Aspect 12 includes the method of any of aspects 1-11, wherein the COT sharing information comprises a COT duration.

Aspect 13 includes the method of any of aspects 1-12, wherein the COT sharing information comprises a range of time resources and a range of frequency resources.

Aspect 14 includes the method of any of aspects 1-13, further comprising: transmitting, to a third sidelink UE during the COT, the COT sharing information for sharing the COT with the third sidelink UE, wherein the COT sharing information indicates: frequency resources allocated to the second sidelink UE frequency division multiplexed with frequency resources allocated to the third sidelink UE; and a same cyclic prefix extension (CPE) length allocated to the second sidelink UE and the third sidelink UE.

Aspect 15 includes the method of any of aspects 1-14, further comprising: transmitting, to a third sidelink UE during the COT, the COT sharing information for sharing the COT with the third sidelink UE, wherein the COT sharing information indicates: time resources allocated to the second sidelink UE time division multiplexed with time resources allocated to the third sidelink UE; a first cyclic prefix extension (CPE) length allocated to the second side-link UE; and a second CPE length allocated to the third sidelink UE, wherein the second CPE length is different from the first CPE length.

Aspect 16 includes the method of any of aspects 1-15, further comprising: transmitting, to a third sidelink UE during the COT, the COT sharing information for sharing the COT with the third sidelink UE, wherein the COT sharing information indicates: a same time resources allocated to the second sidelink UE and the third sidelink UE; a same frequency resources allocated to the second sidelink UE and the third sidelink UE; a first cyclic prefix extension (CPE) length allocated to the second sidelink UE; and a second CPE length allocated to the third sidelink UE, wherein the second CPE length is different from the first CPE length.

Aspect 17 includes the method of any of aspects 1-16, wherein the transmitting the COT sharing information comprises transmitting the COT sharing information in sidelink control information 1 (SCI-1); and the SCI-1 comprises a time domain resource allocation (TDRA) indicating time resources allocated to the second sidelink UE.

Aspect 18 includes the method of any of aspects 1-17, wherein the transmitting the COT sharing information comprises transmitting the COT sharing information in sidelink control information 1 (SCI-1); and the SCI-1 comprises a frequency domain resource allocation (FDRA) indicating frequency resources allocated to the second sidelink UE.

Aspect 19 includes the method of any of aspects 1-18, wherein the transmitting the COT sharing information comprises transmitting the COT sharing information in sidelink control information 2 (SCI-2); and the SCI-2 indicates a groupcast identifier associated with a set of sidelink UEs for sharing the COT, wherein the set of sidelink UEs includes the second sidelink UE.

Aspect 20 includes the method of any of aspects 1-19, wherein the transmitting the COT sharing information comprises transmitting the COT sharing information in sidelink control information 2 (SCI-2); and the SCI-2 indicates an identifier associated with the second sidelink UE.

Aspect 21 includes the method of any of aspects 1-20, further comprising: transmitting, to the second sidelink UE, a radio resource control (RRC) message indicating whether the COT sharing information includes legacy resource reservations.

Aspect 22 includes a method of wireless communication performed by a first sidelink user equipment (UE), the method comprising receiving, from a second sidelink UE, COT sharing information for sharing a COT with the second sidelink UE, wherein the COT sharing information includes an identifier associated with the second sidelink UE; and monitoring for sidelink control information (SCI) from a third sidelink UE that includes the identifier associated with the second sidelink UE.

Aspect 23 includes the method of aspect 22, further comprising receiving, from the second sidelink UE, a flag indicating the first sidelink UE is sharing the COT.

Aspect 24 includes the method of any of aspects 22-23, further comprising receiving, from the second sidelink UE, sidelink control information 2 (SCI-2), wherein the SCI-2 comprises a destination identifier associated with the first sidelink UE indicating the first sidelink UE shares the COT with the second sidelink UE.

Aspect 25 includes the method of any of aspects 22-24, further comprising: receiving, from the third sidelink UE, the SCI that includes the identifier associated with the second sidelink UE; and transmitting, based on the COT sharing information and the SCI, a sidelink communication.

Aspect 26 includes the method of any of aspects 22-25, further comprising: refraining, based on not receiving the SCI that includes the identifier associated with the second sidelink UE, from transmitting a sidelink communication.

Aspect 27 includes the method of any of aspects 22-26, further comprising: performing, based on not receiving the SCI that includes the identifier associated with the second sidelink UE, a listen-before-talk (LBT) procedure; and transmitting, based on the LBT procedure being successful, a sidelink communication.

Aspect 28 includes a method of wireless communication performed by a first sidelink user equipment (UE), the method comprising performing a listen-before-talk (LBT) procedure; acquiring, based on the LBT procedure being successful, a channel occupancy time (COT); and transmitting, to a second sidelink UE during the COT, COT sharing information for sharing the COT with the second sidelink UE, wherein the LBT procedure and the COT sharing information is based on a channel access priority class (CAPC) associated with at least one of the first sidelink UE or the second sidelink UE.

Aspect 29 includes the method of aspect 28, wherein the CAPC is based on at least one of: a 5G quality of service identifier (5QI) associated with the first sidelink UE; a PC5 quality indicator (PQI) associated with the first sidelink UE; a 5QI associated with the second sidelink UE; or a PQI associated with the second sidelink UE.

Aspect 30 includes the method of any of aspects 28-29, wherein the CAPC is based on at least one of: a weighted sum of PC5 quality indicators (PQIs) associated with the first sidelink UE; or a weighted sum of PQIs associated with the second sidelink UE.

Aspect 31 includes the method of any of aspects 28-30, wherein the CAPC is further based on at least one of: a transmit buffer size associated with the first sidelink UE; or a transmit buffer size associated with the second sidelink UE.

Aspect 32 includes the method of any of aspects 28-31, wherein the CAPC is based on at least one of: a priority associated with a communication to be transmitted by the first sidelink UE; or a priority associated with a communication to be transmitted by the second sidelink UE.

Aspect 33 includes a method of wireless communication performed by a first sidelink user equipment (UE), the method comprising receiving, from one or more sidelink UEs, respective first sidelink control information (SCI); storing, in a memory, identifiers associated with each of the one or more sidelink UEs, wherein a signal strength of the first SCIs received from the one or more sidelink UEs satisfies a threshold; performing a listen-before-talk (LBT) procedure; acquiring, based on the LBT procedure being successful, a channel occupancy time (COT); and transmitting, to the one or more sidelink UEs during the COT, COT sharing information for sharing the COT.

Aspect 34 includes the method of aspect 33, wherein the COT sharing information includes a time division multiplexing schedule for sharing the COT.

Aspect 35 includes the method of any of aspects 33-34, further comprising: storing, based on the receiving the first SCIs, timestamps associated with the first SCIs, wherein the COT sharing information is based on the timestamps.

Aspect 36 includes the method of any of aspects 33-35, wherein the COT sharing information schedules the one or more sidelink UEs to share the COT based on an order of the timestamps from an oldest timestamp to a newest timestamp.

Aspect 37 includes the method of any of aspects 33-36, further comprising: monitoring for a second SCI, from the one or more sidelink UEs; and removing from the memory, based on not receiving the second SCI, identifiers associated with each sidelink UE of the one or more sidelink UEs that the first sidelink UE does not receive the second SCI from.

Aspect 38 includes a method of wireless communication performed by a first sidelink user equipment (UE), the method comprising: receiving, from a second sidelink UE, sidelink control information (SCI), wherein the SCI indicates at least one of: a channel access priority class (CAPC) associated a communication to be transmitted by the second sidelink UE; or a periodicity associated with the communication to be transmitted by the second sidelink UE; performing a listen-before-talk (LBT) procedure; acquiring, based on the LBT procedure being successful, a channel occupancy time (COT); and transmitting, to the second sidelink UE during the COT, COT sharing information for sharing the COT with the second sidelink UE, wherein the COT sharing information is based on at least one of the CAPC or the periodicity.

Aspect 39 includes the method of aspects 38, wherein: the SCI further indicates a buffer status report (BSR) associated with the communication to be transmitted by the second sidelink UE, wherein the BSR satisfies a threshold; and the COT sharing information is further based on the BSR.

Aspect 40 includes the method of any of aspects 38-39, wherein the receiving the SCI comprises receiving the SCI via an SCI-2.

Aspect 41 includes a method of wireless communication performed by a first sidelink user equipment (UE), the method comprising: receiving, from a second sidelink UE, a channel occupancy time (COT) access request; performing a listen-before-talk (LBT) procedure; acquiring, based on the LBT procedure being successful, a channel occupancy time (COT); and transmitting, to the second sidelink UE during the COT, COT sharing information for sharing the COT with the second sidelink UE, wherein the COT sharing information is based on COT access request.

Aspect 42 includes the method of aspect 41, wherein: the COT access request indicates requested resources; and the COT sharing information is further based on the requested resources.

Aspect 43 includes the method of any of aspects 41-42, wherein the COT access request is based on a buffer status associated with the second sidelink UE.

Aspect 44 includes the method of any of aspects 41-43, wherein the receiving the COT access request comprises receiving the COT access request via at least one of a physical sidelink feedback channel (PSFCH) communication, a physical sidelink control channel (PSCCH) communication, or a physical sidelink shared channel (PSSCH) communication.

Aspect 45 includes the method of any of aspects 41-44, further comprising: transmitting, to the second sidelink UE, a COT trigger message, wherein the receiving the COT access request is in response to the COT trigger message.

Aspect 46 includes the method of any of aspects 41-45, wherein the transmitting the COT trigger message comprises transmitting the COT trigger message via at least one of sidelink control information (SCI) or a medium access control control element (MAC-CE).

Aspect 47 includes the method of any of aspects 41-46, wherein the transmitting the COT trigger message comprises transmitting the COT trigger message via at least one of a broadcast message, a groupcast message, or a unicast message.

Aspect 48 includes the method of any of aspects 41-47, wherein the transmitting the COT trigger message comprises transmitting the COT trigger message based on a buffer status associated with the first sidelink UE.

Aspect 49 includes the method of any of aspects 41-48, wherein the COT trigger message includes at least one of: a flag indicating a request for the COT access request; a zone identifier associated with the first sidelink UE; a reference signal received power (RSRP) threshold associated with the first sidelink UE; a maximum time duration associated with receiving the COT access request; or a COT start time.

Aspect 50 includes the method of any of aspects 41-49, wherein the COT access request includes at least one of: a flag indicating a request for COT sharing; a time resource request; a frequency resource request; or a channel access priority class (CAPC) associated with a communication to be transmitted by the second sidelink UE.

Aspect 51 includes a non-transitory computer-readable medium storing one or more instructions for wireless communication, the one or more instructions comprising one or more instructions that, when executed by one or more processors of a first sidelink UE, cause the first sidelink UE to perform any one of aspects 1-21.

Aspect 52 includes a non-transitory computer-readable medium storing one or more instructions for wireless communication, the one or more instructions comprising one or more instructions that, when executed by one or more processors of a first sidelink UE, cause the first sidelink UE to perform any one of aspects 22-27.

Aspect 53 includes a non-transitory computer-readable medium storing one or more instructions for wireless communication, the one or more instructions comprising one or more instructions that, when executed by one or more processors of a first sidelink UE, cause the first sidelink UE to perform any one of aspects 28-32.

Aspect 54 includes a non-transitory computer-readable medium storing one or more instructions for wireless communication, the one or more instructions comprising one or more instructions that, when executed by one or more processors of a first sidelink UE, cause the first sidelink UE to perform any one of aspects 33-37.

Aspect 55 includes a non-transitory computer-readable medium storing one or more instructions for wireless communication, the one or more instructions comprising one or more instructions that, when executed by one or more processors of a first sidelink UE, cause the first sidelink UE to perform any one of aspects 41-50.

Aspect 56 includes a first sidelink user equipment (UE) comprising one or more means to perform any one or more of aspects 1-21.

Aspect 57 includes a first sidelink user equipment (UE) comprising one or more means to perform any one or more of aspects 22-27.

Aspect 58 includes a first sidelink user equipment (UE) comprising one or more means to perform any one or more of aspects 28-32.

Aspect 59 includes a first sidelink user equipment (UE) comprising one or more means to perform any one or more of aspects 33-37.

Aspect 60 includes a first sidelink user equipment (UE) comprising one or more means to perform any one or more of aspects 41-50.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a first sidelink user equipment (UE), the method comprising:
performing a listen-before-talk (LBT) procedure;
acquiring, based on the LBT procedure being successful, a channel occupancy time (COT);
transmitting a flag via sidelink control information indicating the first sidelink UE is sharing the COT, wherein the flag is transmitted in a physical sidelink feedback channel (PSFCH) communication; and
transmitting, to a second sidelink UE during the COT, COT sharing information for sharing the COT with the second sidelink UE, wherein sharing the COT with the second sidelink UE is based at least in part on the flag.

2. The method of claim 1, further comprising:
transmitting, to a set of sidelink UEs during the COT, a COT resource allocation for sharing the COT with the set of sidelink UEs, wherein the set of sidelink UEs includes the second sidelink UE.

3. The method of claim 1, further comprising:
transmitting, based on the LBT being successful, a sidelink communication during the COT to one or more sidelink UEs different than the second sidelink UE.

4. The method of claim 1,
wherein the transmitting the COT sharing information comprises transmitting the COT sharing information in a SLCOTSharingInformation field via sidelink control information 2 (SCI-2).

5. The method of claim 1, further comprising:
transmitting sidelink control information 2 (SCI-2) via a physical sidelink shared channel (PSSCH), wherein the SCI-2 comprises a destination identifier associated with the second sidelink UE indicating the first sidelink UE shares the COT with the second sidelink UE.

6. The method of claim 1,
wherein the COT sharing information comprises at least one of:
identifiers associated with a set of sidelink UEs that share the COT, wherein the identifiers include an identifier associated with the second sidelink UE;
a time resource allocation associated with the COT sharing;
a frequency resource allocation associated with the COT sharing;
a COT start time;
a COT end time;
a starting frequency;
and end frequency;
one or more frequency interlaces; or
a cyclic prefix extension (CPE) length associated with the COT sharing.

7. The method of claim 6,
wherein the COT sharing information includes the time resource allocation and the time resource allocation includes at least one of:
a slot index indicating a starting slot allocated to the second sidelink UE to share the COT;

a number of slots allocated to the second sidelink UE to share the COT;

a subslot index indicating a starting subslot allocated to the second sidelink UE to share the COT; or a number of subslots allocated to the second sidelink UE to share the COT.

8. The method of claim 6, wherein the COT sharing information includes the frequency resource allocation and the frequency resource allocation includes at least one of:

a starting frequency subchannel index indicating a starting frequency subchannel allocated to the second sidelink UE to share the COT;

a starting frequency interlace index indicating a starting frequency interlace allocated to the second sidelink UE to share the COT;

a starting resource block index indicating a starting resource block allocated to the second UE to share the COT;

a number of frequency subchannels allocated to the second sidelink UE to share the COT;

a number of frequency interlaces allocated to the second sidelink UE to share the COT; or a number of resource blocks allocated to the second sidelink UE to share the COT.

9. The method of claim 1, wherein the COT sharing information comprises at least one of:

a COT duration;

a range of time resources; or a range of frequency resources.

10. The method of claim 1, further comprising:

transmitting, to a third sidelink UE during the COT, the COT sharing information for sharing the COT with the third sidelink UE, wherein the COT sharing information indicates:

frequency resources allocated to the second sidelink UE frequency division multiplexed with frequency resources allocated to the third sidelink UE; and a same a cyclic prefix extension (CPE) length allocated to the second sidelink UE and the third sidelink UE.

11. The method of claim 1, further comprising:

transmitting, to a third sidelink UE during the COT, the COT sharing information for sharing the COT with the third sidelink UE, wherein the COT sharing information indicates:

time resources allocated to the second sidelink UE time division multiplexed with time resources allocated to the third sidelink UE;

a first cyclic prefix extension (CPE) length allocated to the second sidelink UE; and a second CPE length allocated to the third sidelink UE, wherein the second CPE length is different from the first CPE length.

12. The method of claim 1, further comprising:

transmitting, to a third sidelink UE during the COT, the COT sharing information for sharing the COT with the third sidelink UE, wherein the COT sharing information indicates:

a same time resources allocated to the second sidelink UE and the third sidelink UE;

a same frequency resources allocated to the second sidelink UE and the third sidelink UE;

a first cyclic prefix extension (CPE) length allocated to the second sidelink UE; and a second CPE length allocated to the third sidelink UE, wherein the second CPE length is different from the first CPE length.

13. The method of claim 1, wherein the transmitting the COT sharing information comprises transmitting the COT sharing information in sidelink control information 1 (SCI-1); and the SCI-1 comprises a time domain resource allocation (TDRA) indicating time resources allocated to the second sidelink UE.

14. The method of claim 1, wherein the transmitting the COT sharing information comprises transmitting the COT sharing information in sidelink control information 1 (SCI-1); and the SCI-1 comprises a frequency domain resource allocation (FDRA) indicating frequency resources allocated to the second sidelink UE.

15. The method of claim 1, wherein the transmitting the COT sharing information comprises transmitting the COT sharing information in sidelink control information 2 (SCI-2); and the SCI-2 indicates a groupcast identifier associated with a set of sidelink UEs for sharing the COT, wherein the set of sidelink UEs includes the second sidelink UE.

16. The method of claim 1, wherein the transmitting the COT sharing information comprises transmitting the COT sharing information in sidelink control information 2 (SCI-2); and the SCI-2 indicates an identifier associated with the second sidelink UE.

17. The method of claim 1, further comprising:

transmitting, to the second sidelink UE, a radio resource control (RRC) message indicating whether the COT sharing information includes legacy resource reservations.

18. The method of claim 1, wherein the LBT procedure and the COT sharing information are based on a channel access priority class (CAPC) associated with at least one of the first sidelink UE or the second sidelink UE.

19. The method of claim 18, wherein the CAPC is based on at least one of:

a 5G quality of service identifier (5QI) associated with the first sidelink UE;

a PC5 quality indicator (PQI) associated with the first sidelink UE;

a 5QI associated with the second sidelink UE; or a PQI associated with the second sidelink UE.

20. A first sidelink user equipment (UE) comprising:

a memory;

a transceiver; and at least one processor coupled to the memory and the transceiver, wherein the first sidelink UE is configured to:

perform a listen-before-talk (LBT) procedure;

acquire, based on the LBT procedure being successful, a channel occupancy time (COT);

transmit a flag via sidelink control information indicating the first sidelink UE is sharing the COT, wherein the flag is transmitted in a physical sidelink feedback channel (PSFCH) communication; and transmit, to a second sidelink UE during the COT, COT sharing information for sharing the COT with the second sidelink UE, wherein sharing the COT with the second sidelink UE is based at least in part on the flag.

21. The first sidelink UE of claim 20,
wherein the first sidelink UE is further configured to:
    transmit, to a set of sidelink UEs during the COT, a COT resource allocation for sharing the COT with the set of sidelink UEs, wherein the set of sidelink UEs includes the second sidelink UE.

22. The first sidelink UE of claim 20,
wherein the first sidelink UE is further configured to:
    transmit, based on the LBT being successful, a sidelink communication during the COT to one or more sidelink UEs different than the second sidelink UE.

23. A non-transitory computer-readable medium having program code recorded thereon executable by one or more processors for wireless communication by a first sidelink user equipment (UE), the program code comprising:
    code for causing the first sidelink UE to perform a listen-before-talk (LBT) procedure;
    code for causing the first sidelink UE to acquire, based on the LBT procedure being successful, a channel occupancy time (COT);
    code for causing the first sidelink UE to transmit a flag via sidelink control information indicating the first sidelink UE is sharing the COT, wherein the flag is transmitted in a physical sidelink feedback channel (PSFCH) communication; and
    code for causing the first sidelink UE to transmit, to a second sidelink UE during the COT, COT sharing information for sharing the COT with the second sidelink UE, wherein sharing the COT with the second sidelink UE is based at least in part on the flag.

24. The non-transitory computer-readable medium of claim 23, further comprising:
    code for causing the first sidelink UE to transmit, to a set of sidelink UEs during the COT, a COT resource allocation for sharing the COT with the set of sidelink UEs, wherein the set of sidelink UEs includes the second sidelink UE.

25. The non-transitory computer-readable medium of claim 23, further comprising:
    code for causing the first sidelink UE to transmit, based on the LBT being successful, a sidelink communication during the COT to one or more sidelink UEs different than the second sidelink UE.

26. The non-transitory computer-readable medium of claim 23,
wherein the transmitting the COT sharing information comprises transmitting the COT sharing information in a SLCOTSharingInformation field via sidelink control information 2 (SCI-2).

27. The non-transitory computer-readable medium of claim 23, further comprising:
    code for causing the first sidelink UE to transmit sidelink control information 2 (SCI-2) via a physical sidelink shared channel (PSSCH), wherein the SCI-2 comprises a destination identifier associated with the second sidelink UE indicating the first sidelink UE shares the COT with the second sidelink UE.

28. The non-transitory computer-readable medium of claim 23,
wherein the COT sharing information comprises at least one of:
    identifiers associated with a set of sidelink UEs that share the COT, wherein the identifiers include an identifier associated with the second sidelink UE;
    a time resource allocation associated with the COT sharing;
    a frequency resource allocation associated with the COT sharing;
    a COT start time;
    a COT end time;
    a starting frequency;
    and end frequency;
    one or more frequency interlaces; or
    a cyclic prefix extension (CPE) length associated with the COT sharing.

29. The non-transitory computer-readable medium of claim 28,
wherein the COT sharing information includes the time resource allocation and the time resource allocation includes at least one of:
    a slot index indicating a starting slot allocated to the second sidelink UE to share the COT;
    a number of slots allocated to the second sidelink UE to share the COT;
    a subslot index indicating a starting subslot allocated to the second sidelink UE to share the COT; or
    a number of subslots allocated to the second sidelink UE to share the COT.

30. The non-transitory computer-readable medium of claim 28,
wherein the COT sharing information includes the frequency resource allocation and the frequency resource allocation includes at least one of:
    a starting frequency subchannel index indicating a starting frequency subchannel allocated to the second sidelink UE to share the COT;
    a starting frequency interlace index indicating a starting frequency interlace allocated to the second sidelink UE to share the COT;
    a starting resource block index indicating a starting resource block allocated to the second UE to share the COT;
    a number of frequency subchannels allocated to the second sidelink UE to share the COT;
    a number of frequency interlaces allocated to the second sidelink UE to share the COT; or
    a number of resource blocks allocated to the second sidelink UE to share the COT.

\*   \*   \*   \*   \*